US011806631B2

(12) United States Patent
Nair et al.

(10) Patent No.: US 11,806,631 B2
(45) Date of Patent: Nov. 7, 2023

(54) GAMING CONTENT RECOMMENDATION FOR A VIDEO GAME

(71) Applicant: Rovi Guides, Inc., San Jose, CA (US)

(72) Inventors: Govind Raveendranathan Nair, Karnataka (IN); Sangeeta Parida, Delhi (IN); Amrit Srivastava, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/871,582

(22) Filed: May 11, 2020

(65) Prior Publication Data

US 2021/0346807 A1 Nov. 11, 2021

(51) Int. Cl.
  *A63F 13/798* (2014.01)
  *A63F 13/80* (2014.01)
  *A63F 13/85* (2014.01)

(52) U.S. Cl.
  CPC ............ *A63F 13/798* (2014.09); *A63F 13/80* (2014.09); *A63F 13/85* (2014.09); *A63F 2300/558* (2013.01)

(58) Field of Classification Search
  CPC ........ A63F 13/35; A63F 13/798; A63F 13/85; A63F 13/67; A63F 13/79; A63F 13/80; A63F 2300/5566; A63F 2300/558
  See application file for complete search history.

(56) References Cited

U.S. PATENT DOCUMENTS

| | | | |
|---|---|---|---|
| 7,761,892 B2 | 7/2010 | Ellis et al. | |
| 8,190,907 B2* | 5/2012 | Tu | G06F 21/32 713/186 |
| 8,298,087 B1* | 10/2012 | Smith | A63F 13/792 463/42 |
| 8,504,843 B2* | 8/2013 | Tu | A63F 13/71 713/186 |
| 8,651,961 B2* | 2/2014 | Muller | A63F 13/45 463/42 |
| 9,227,140 B2* | 1/2016 | Muller | A63F 13/45 |
| 9,352,226 B2* | 5/2016 | Miura | A63F 9/24 |
| 9,387,392 B1* | 7/2016 | Jordan | A63F 9/24 |
| 9,778,737 B1* | 10/2017 | Strand | G06F 3/017 |
| 10,751,623 B2* | 8/2020 | Trombetta | A63F 13/798 |
| 10,765,948 B2* | 9/2020 | Eatedali | A63F 13/798 |
| 10,848,805 B1* | 11/2020 | Mattar | H04N 21/6582 |
| 10,864,443 B2* | 12/2020 | Eatedali | A63F 13/35 |
| 11,213,756 B2* | 1/2022 | Nair | H04N 21/8549 |

(Continued)

OTHER PUBLICATIONS

International Search Report and Written Opinion of PCT/US2020/065940 dated Mar. 18, 2021.

*Primary Examiner* — William H McCulloch, Jr.
(74) *Attorney, Agent, or Firm* — HALEY GUILIANO LLP

(57) ABSTRACT

Systems and methods for providing game content recommendation of a video game based on player's performance are disclosed. Prior to an actual video game play, a performance metric is calculated based on a stored player data and video settings of the game. The performance metric is evaluated to further calculate a performance metric of video game play session content indicative of aspects of actual video game play. A metrics data of each player in determined from the video game play session content. The player metrics data is analyzed relative to the stored player data and the video settings of the game to determine whether to recommend the video game play session content.

18 Claims, 18 Drawing Sheets

(56) References Cited

U.S. PATENT DOCUMENTS

| | | | | |
|---|---|---|---|---|
| 11,213,759 | B1* | 1/2022 | Pichaimurthy | A63F 13/35 |
| 11,318,391 | B2* | 5/2022 | Nair | A63F 13/46 |
| 2008/0208544 | A1* | 8/2008 | Buendia | G06N 5/04 |
| | | | | 703/2 |
| 2011/0161267 | A1* | 6/2011 | Chowdhary | G06N 3/08 |
| | | | | 706/21 |
| 2012/0142429 | A1* | 6/2012 | Muller | A63F 13/35 |
| | | | | 463/42 |
| 2012/0197874 | A1* | 8/2012 | Zatkin | G07F 17/3227 |
| | | | | 707/722 |
| 2014/0179439 | A1* | 6/2014 | Miura | A63F 13/2145 |
| | | | | 463/42 |
| 2014/0274371 | A1* | 9/2014 | Helava | A63F 13/88 |
| | | | | 463/31 |
| 2016/0232575 | A1* | 8/2016 | Kirti | G06Q 50/01 |
| 2016/0346687 | A1* | 12/2016 | Kerrien | A63F 13/79 |
| 2018/0341860 | A1* | 11/2018 | Shazeer | G06N 3/04 |
| 2018/0353846 | A1* | 12/2018 | Nowak | G07F 17/3244 |
| 2018/0357753 | A1* | 12/2018 | Lehtinen | G06N 3/08 |
| 2019/0192971 | A1* | 6/2019 | Eatedali | A63F 13/58 |
| 2019/0262713 | A1* | 8/2019 | Trombetta | A63F 13/533 |
| 2019/0295357 | A1* | 9/2019 | Jordan | G07F 17/323 |
| 2020/0306635 | A1* | 10/2020 | Viswanathan | H04N 21/4781 |
| 2020/0324208 | A1* | 10/2020 | Cleven | A63F 13/847 |
| 2021/0086089 | A1* | 3/2021 | Pardeshi | G06N 3/04 |
| 2021/0187398 | A1* | 6/2021 | Nair | H04N 21/8549 |
| 2021/0232627 | A1* | 7/2021 | Schuckle | A63F 13/23 |
| 2021/0346807 | A1* | 11/2021 | Nair | A63F 13/795 |
| 2021/0346808 | A1* | 11/2021 | Nair | A63F 13/58 |
| 2022/0023763 | A1* | 1/2022 | Pichaimurthy | A63F 13/46 |
| 2022/0040585 | A1* | 2/2022 | Pichaimurthy | A63F 13/798 |
| 2022/0161143 | A1* | 5/2022 | Nair | A63F 13/67 |

* cited by examiner

800

|  | | 802 Team 1 | 804 Team 2 |
|---|---|---|---|
| 806 | Defence Score | 9 | 7 |
| | CC Score | 7 | 8 |
| | AP Score | 7 | 9 |
| | AD Score | 9 | 8 |
| 808 | AVG Team Score | <u>8</u> | <u>8</u> |

In Game Analysis

Team score: 1004

1006

1008

| Team | Time (Mins) | CP | RF | RT | OC | TOC | TD | MM | TF | AT | Average |
|---|---|---|---|---|---|---|---|---|---|---|---|
| A | 10 | 9 | 7 | 8 | 7 | 9 | 6 | 7 | 8 | 8 | 7.67 |
| B | 10 | 7 | 9 | 7.5 | 8 | 7 | 8 | 7 | 7.3 | 7.2 | 7.56 |
| A | 20 | 8 | 6.7 | 7.5 | 7.3 | 9.1 | 6.5 | 7.1 | 7.9 | 8 | 7.57 |
| B | 20 | 7.1 | 9.1 | 7.3 | 8.1 | 6.7 | 8 | 6.7 | 7.5 | 7.5 | 7.56 |
| A | 30 | 8.5 | 6.5 | 7.1 | 6.9 | 9 | 7 | 7.3 | 7.8 | 7.5 | 7.51 |
| B | 30 | 7.3 | 9 | 6.9 | 7.9 | 6.5 | 8.7 | 6.5 | 7.2 | 8 | 7.56 |
| A | 40 | 8 | 7.2 | 6.9 | 6.8 | 8.5 | 6.5 | 7.5 | 7.9 | 7.7 | 7.44 |
| B | 40 | 7 | 8.5 | 6.8 | 7.6 | 7.2 | 8.2 | 6 | 7.7 | 8.1 | 7.46 |
| A | 50 | 8.3 | 7.5 | 6.8 | 6.7 | 8.3 | 6.7 | 6.5 | 8 | 7.9 | 7.41 |
| B | 50 | 6.9 | 8.3 | 6.7 | 8.1 | 7.5 | 8.3 | 7.5 | 7 | 8.1 | 7.6 |
| A | 60 | 8.75 | 7.1 | 7.2 | 6.9 | 8.5 | 6.5 | 6.5 | 8 | 7.9 | 7.48 |
| B | 60 | 6.5 | 8.7 | 6.9 | 7.8 | 7.1 | 8.75 | 7.3 | 7.7 | 8.4 | 7.68 |

802 — A (row 1)
804 — B (row 2)

CP - Character positioning
RF - Route Followed
RT - Reaction Time
OC - Objective captured
TOC - Time taken for OC
TD - Target Destroyed
MM - Minion Management
TF - TeamFight
AT - Advanced techniques

In Game Analysis

| Timeline (minutes) | Team A | Team B | Average |
|---|---|---|---|
| 10 | 7.67 | 7.56 | 7.61 |
| 20 | 7.57 | 7.56 | 7.56 |
| 30 | 7.51 | 7.56 | 7.53 |
| 40 | 1022 { 7.44 | 1024 { 7.46 | 1026 { 7.45 |
| 50 | 7.41 | 7.6 | 7.50 |
| 60 | 7.48 | 7.68 | 7.58 |
| Average of full game | 7.51 | 7.57 | 7.54 |

1004, 802, 804

1130

| | 802 Team 1 | 804 Team 2 |
|---|---|---|
| AP Def Score | 9 | 7 |
| AD DefScore | 7 | 9 |
| AD Score | 8 | 7.5 |
| CC Done | 7 | 8 |
| CC Def | 9 | 7 |
| AP | 6 | 8 |
| Healing | 7 | 7 |
| AVG Team Score | 7.57 | 7.42 |

1136 groups the seven metric rows; 1138 labels the AVG Team Score row.

1202
Analyze stored player data for each player of each team associated with the video game play session and stored settings for the MOBA video game, wherein the player data includes metrics related to attack metrics, defense metrics, and damage metrics to determine to evaluate the video game play session content

1204
Analyze in-game performance of each player of each team in the video game play session content based on a game map of the video game play session content and on in-game metrics for each player of each team determined from the video game play session content, wherein the in-game metrics includes in-game attack metrics, in-game defense metrics, and in-game damage metrics

1206
Analyze the aggregated performance metrics after end of the video game play session to determine post-game metrics in terms of player data (metrics related to attack, defense and damage metrics) for evaluation of the video game play session content

1208
Recommend the video play session content based on the in-game performance of each player of each team

FIG. 12

GAMING CONTENT RECOMMENDATION FOR A VIDEO GAME

BACKGROUND

The present disclosure relates to systems for content recommendation and, more particularly, to systems and related processes for recommending gaming content, such as video game play session content for a video game based on players' performance.

SUMMARY

Video game play content may be recommended to a user based on the user's watching history of the video games, genre of the games, and rating of the teams played in the video games. With some recommendation engines, however, such recommendations of the game play may be biased. For example, a particular team may be top rated compared to another team, but that team may not have played their best in that game. The recommendation engine will not evaluate the game based on how that game was played by a player or the entire team for a particular genre at a particular level.

In view of the foregoing, the present disclosure provides systems and related methods that recommend video game play content session content for a video game based on a player's and/or team's performance in the game. In some embodiments, the recommendation is based on sequential order of a pre-game analysis, an in-game analysis, and a post-game analysis of the video play game play content.

In one example, a system compares information in the post-game analysis with information in the pre-game analysis to determine whether to recommend the video game play content. For example, the system analyzes a particular player's statistics before the game (pre-game analysis) and determines how that player played in an actual game (in-game analysis). Assuming the player played well in the actual game, the system analyzes the player's statistics (e.g. no. of kills, no. of saves etc.) in the post-game analysis and determines whether the statistics are approximately same as the player's statistics in the pre-game analysis. In other words, if system determines whether the player's performance during the in-game analysis is close to performance in the pre-game analysis. If it is determined that the players' performance is determined to be close, then the system recommends video game play content of the actual video game.

In another example, the system determines, in the pre-game analysis, whether a game play of a video game is interesting or not. For example, in the pre-game analysis, the system would analyze to determine that a player performance was really good, e.g. player killed 20 dragons in 30 minutes and thus would find the video game to be interesting. If the game play is determined to be interesting, then the system would further evaluate the game play of the video game in the in-game analysis. In the in-game analysis, the system would for example, determine the same player's performance to be good also, e.g. the player killed 19 dragons in 30 minutes. Then, the system recommends the user to watch the video game play content of the actual video game.

The method, in one aspect, includes calculating a pre-game performance metric based on stored player data and on stored settings for the video game. A determination is made that the pre-game performance metric meets a pre-game threshold. In response to determining that the pre-game performance metric meets the pre-game threshold, an in-game performance metric is calculated based on stored metadata associated with the video game play session content that is indicative of aspects of game play. Also, a determination is made that the in-game performance metric meets an in-game performance threshold. In response to determining that the in-game performance metric meets the in-game performance threshold, aggregated statistics from the video game play session content are determined. The method further analyzes the aggregated statistic relative to the stored player data and stored settings for the video game and based on the analyzing, determines whether to recommend the video game play session content.

In another aspect, the method includes evaluating video game play session content for a multiplayer online battle arena (MOBA) video game. Player data for each player of each team associated with the video game play session and stored settings for the MOBA video game is analyzed to determine to evaluate the video game play session content. The player data includes metrics related to attack metrics, defense metrics, and damage metrics. In response to determining to evaluate the video game play session content, an in-game performance of each player of each team in the video game play session content is analyzed based on a game map of the video game play session content and on in-game metrics for each player of each team determined from the video game play session content. The in-game metrics includes in-game attack metrics, in-game defense metrics, and in-game damage metrics. The method further determines whether to recommend the video game play session content based on the in-game performance of each player of each team.

BRIEF DESCRIPTION OF THE DRAWINGS

The above and other objects and advantages of the disclosure will be apparent upon consideration of the following detailed description, taken in conjunction with the accompanying drawings, in which:

FIG. 8 illustrates an example of a table structure of pre-game performance metrics of pre-game analysis of the video game, in accordance with some embodiments of the disclosure;

FIG. 10A illustrates an example of a table structure of in-game performance metrics of an in-game analysis of the video game, in accordance with some embodiments of the disclosure;

FIG. 11C shows an example of table structure of aggregated post-game performance metrics of teams in-post analysis of the video game, accordance with some embodiments of the disclosure;

FIG. 12 is an illustrative flowchart of a process for recommending a video game in accordance with another embodiment of the disclosure;

DETAILED DESCRIPTION

Figure 1:
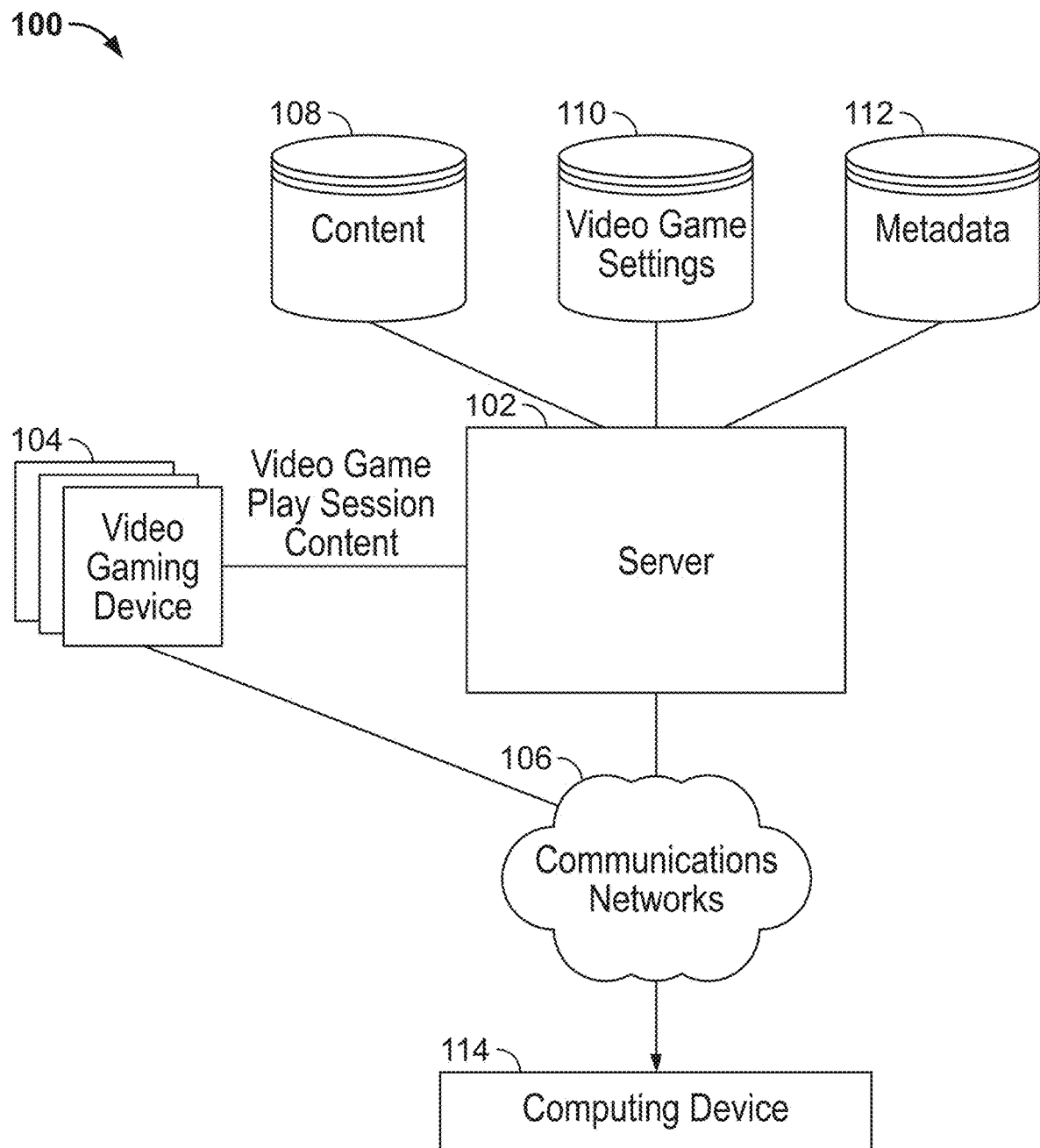
FIG. 1 is an illustrative block diagram of a system for recommending gaming content of a video game, in accordance with some embodiments of the disclosure.

FIG. 1 shows an illustrative block diagram of system 100 for recommending game play session content for a video game, in accordance with some embodiments of the disclosure. System 100 includes server 102, video gaming devices 104, communication network 106, content source or database 108, video game settings database 110, metadata database 112 and computing device 114. Although FIG. 1 shows content source 108, video game settings database 110, and metadata database 112 as individual components and as separate from server 102, in some embodiments, any of those components may be combined and/or integrated as one device with server 102. In one embodiment, server 102 is communicatively coupled to video gaming devices 104, content source 108, the video game settings database 110 and metadata database 112 by way of additional communication paths, which may be included in communication network 106 or may be separate from communication network 106. Communication network 106 may be any type of communication network, such as the Internet, a mobile phone network, mobile voice or data network (e.g., a 4G or LTE network), cable network, public switched telephone network, or any combination of two or more of such communication networks. Communication network 106 includes one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths, such as a proprietary communication path and/or network 103. Network 106, in various aspects, may include the Internet or any other suitable network or group of networks.

In one embodiment, the server 102 is communicably coupled to the computing device 114 by way of the communication network 106. Some example types of computing device 102 include, without limitation, a gaming device (such as a PLAYSTATION device, an XBOX device, or any other gaming device), a smartphone, a tablet, a personal computer, a set-top box (STB), a digital video recorder (DVR), and/or the like, that provides various user interfaces configured to receive and view content and/or interact with the server 102 and/or the video gaming device(s) 104. In some examples, computing device 102 provides a display, which is configured to display information via a graphical user interface.

In one embodiment, the server 102 is configured to aggregate over communication network 106, from a variety sources, such video gaming devices 104, content that helps to evaluate the video game play session content of the video game for a particular genre at a particular level. Some different types of genres of video games include action, adventure, horror, sports, role play, strategy, puzzle, board, and any combinations of these genres. Server 102 evaluates the video game play session content based on how the game was played. For example, server 102 may receive content, such as challenge tutorials or video clips of actual game play played in the video gaming devices 104, that shows how the game was played by player(s) and/or the entire team in particular video games or segments thereof. In some embodiments, the server 102 functions to recommend video game play session content to a user of a computing device 114. In one embodiment, the recommendation is based on sequential order of pre-game analysis, in-game analysis, and post-game analysis of the video game play content. The server 102 compares information in the post-game analysis with information in the post-game analysis to determine whether to recommend the video game play content.

In some embodiments, during the pre-game analysis, the server 102 retrieves player data from the content 108. In one embodiment, the player data includes names/characters of one or more players and player meta data. In one example, the player metadata includes aggregated statistics of combined measurement of performance skills of the player(s) prior to the game play (e.g. FIG. 9). In some embodiments, the server retrieves stored video game settings 110 of the video game. Some different types of settings include physical, temporal, emotional, ethical, and environmental. The settings may vary depending on the genre of the game, in one embodiment, the server 102 calculates in-game performance metrics based on the player data and the video game settings. In one example, the pre-game performance metrics measures performance of the team(s) using the existing player data and the video settings. The pre-game performance metric measures performance of the teams with respect to the skills of their respective players prior to the actual game play. The pre-game performance metric measures performance of the teams prior to the actual game play (e.g. FIG. 8). The pre-game performance metric is compared to a pre-game threshold (pre-determined) to determine likelihood of a video game session of interest. In one embodiment, upon determination of the likelihood of the video game session of interest, stored player data of the video game is used for post-game analysis as described below.

In some embodiments, during the in-game analysis, the server 102 retrieves metadata 112 corresponding to video game play session content, which indicates aspects of game play. The metadata includes game play metadata of the video game session. The game play metadata includes parameters that measure abilities of the teams during actual game play. In one embodiment, the server 102 uses the game play metadata to calculate in-game performance metrics of the game play based on game progression during the video game session. The in-game performance metrics measures various skills performed during the video game session of the actual game play. Some examples of the in-game performance skills include character positioning (CP), route followed (RF), reaction time (RT) etc. The in-game performance metric is compared to an in-game threshold (pre-determined) to determine a compelling game play. In one embodiment, the server determines an aggregated statistics of each of the skills of each of the players from video game play session content. In one example, the aggregated statistics is combined measurement of performance skills of the player(s) during the video game session of the actual game play. In one example, the aggregated statistics is combined measurement of performance skills of the teams during the video game session of the actual game play (e.g. FIGS. 10A, 10B & 10C).

In some embodiments, during the post-game analysis, the server 102 compares the aggregated statistics from the video game play session content of the in-game analysis with the aggregated statistics prior to the game play stored in the player data of the video game selected in the pre-game analysis. In one embodiment, the server determines that the aggregated statistics from the video play session content is approximately equivalent to the aggregated statistics of the player data and recommends the video play session content to a user of the computing device 114.

Figure 2:
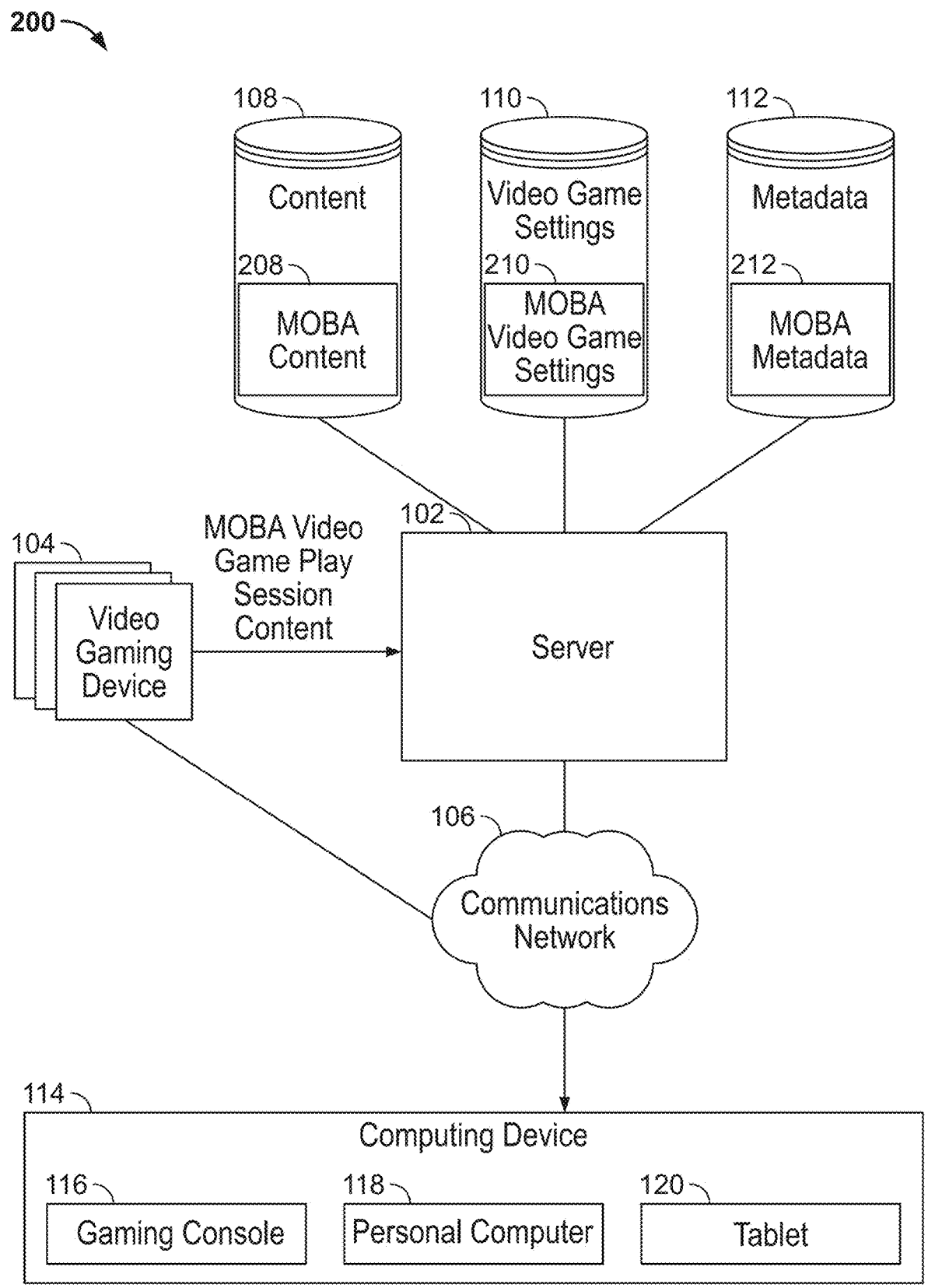
FIG. 2 is an illustrative block diagram of a system for recommending gaming content of a multiplayer online battle arena (MOBA) video game, in accordance with some embodiments of the disclosure.

FIG. 2 shows an illustrative block diagram of system 200 for recommending content based on mobile online battle arena multiplayer (MOBA) video game, in accordance with some embodiments of the disclosure. In various embodiments, system 200 includes some components described above in connection with system 100. In particular, system 200 includes server 102, video gaming devices 104, communication network 106, content source 108, video game settings database 110, metadata database 112 and the computing device 114. Although FIG. 2 shows content source 108, video game settings database 110, and metadata database 112 as individual components and as separate from server 102, in some embodiments, any of those components may be combined and/or integrated as one device with server 102. As shown, server 102 is communicatively coupled to gaming devices 104 by way of communication network 106 and is communicatively coupled to content source 108, metadata database 110, gaming log database 202 by way of additional communication paths, which may be included in communication network 106 or may be separate from communication network 106.

As illustrated in FIG. 2, in one embodiment, the content 108 includes MOBA content 208, which includes player data corresponding to a MOBA video game. In one example, the MOBA content includes player data such as aggregated pre-game metrics for each of the players in the teams (e.g. FIG. 9). The aggregated pre-game metrics is a combined measurement of performance skills (e.g. defense skills, attack skills, damage skills, healing skills, control skills) of the player(s) prior to the MOBA video game play. Some examples of the pre-game metrics include pre-game damage metrics, pre-game attack metrics, pre-game defense metrics, pre-game crowd control metrics, pregame global ability metrics etc. In one embodiment, the video settings 110 include MOBA video game settings 210. In one example the MOBA video game setting is a battle ground with two separate teams of multiple players. In one embodiment, the metadata 212 includes MOBA metadata of a game map and parameters of the MOBA video game play. Some of the parameters include character positioning, route followed, reaction time, objective captured, time elapsed in objective capturing and target destroyed. The character positioning includes positioning of the characters as soon as the game starts for both the teams. The route followed is the route followed by the players in the teams. The reaction time is time it takes for the player/team to reach objectives and participate in fights. The objective captured is the number of objectives captured by the players/teams. Time elapsed is the time it took for the player/teams to capture the objective.

In one embodiment, the server 102 executes a pre-game analysis of the MOBA video game play to evaluate a MOBA video game play session content. For example, the server 102 determines in the pre-game analysis whether the MOBA video game is interesting or not. The server utilizes the MOBA video game setting 212 and the aggregated pre-game metrics from MOBA content 208 for each of the players in the team to determine pre-game performance metric of each of the teams. In one example, the server 102 utilizes a graph including the aggregated pre-game metrics (e.g. FIG. 9) of the pre-game analysis of three players in a team. The pre-game performance metric measures performance of the teams prior to the actual MOBA video game play (e.g. FIG. 8). The pre-game performance metric is compared to a pre-game threshold (pre-determined) to determine likelihood of a MOBA video game session of interest. In one embodiment, upon determination of the likelihood of the MOBA video game session of interest, the aggregated pre-game metrics of the video game is used for post-game analysis as described below.

In one embodiment, the server 102 executes an in-game analysis of the MOBA video game. The server 102 utilizes the game map and the parameters from the MOBA metadata 212 to evaluate the MOBA video game session content in an actual MOBA video game session. Specifically, the server 102 calculates in-game performance metrics of video game session content utilizing the game map and the parameters. Some examples of the in-game performance metrics include route calculation, number of objectives captured etc. In one example, the server 102 utilizes the route followed parameter to calculate the route that was followed to reach the target. In another example, the sever 102 utilizes the objective captured parameter to calculate number of objects captured by the players/teams. In one example, the in-game performance metrics is compared to an in-game threshold (pre-determined) to determine a compelling game play. In one embodiment, the server 102 determines in-game performance metrics of each of the teams from MOBA video game play session content. The in-game performance metrics are measurement of team's performance during the actual MOBA video game play. The in-game performance metrics correspond to the team's skills during the MOBA video game play session. In one embodiment, the server 102 calculates an in-game metrics of each of the teams during the MOBA video game session of the actual MOBA game play (e.g. FIG. 10A). The in-game metrics represent the teams' skills during the actual MOBA video game play. Some examples of the in-game metrics include in-game damage metrics, in-game attack metrics, in-game defense metrics, in-game crowd control metrics, in-game global ability metrics etc. The server combines the in-game metrics of each of the teams to calculated aggregated statistics from the video game play session content in-game analysis (e.g. FIGS. 10B & 10C).

In one embodiment, during the post-game analysis, the server 102 compares the aggregated statistics from the in-game analysis with the aggregated statistics of the pre-game analysis. In one embodiment, the server determines that the aggregated statistics of the in-game analysis from the video play session content is approximately equivalent to the aggregated statistics from pre-game analysis and recommends the MOBA video play session content to a user of the computing device 114.

Figure 3:
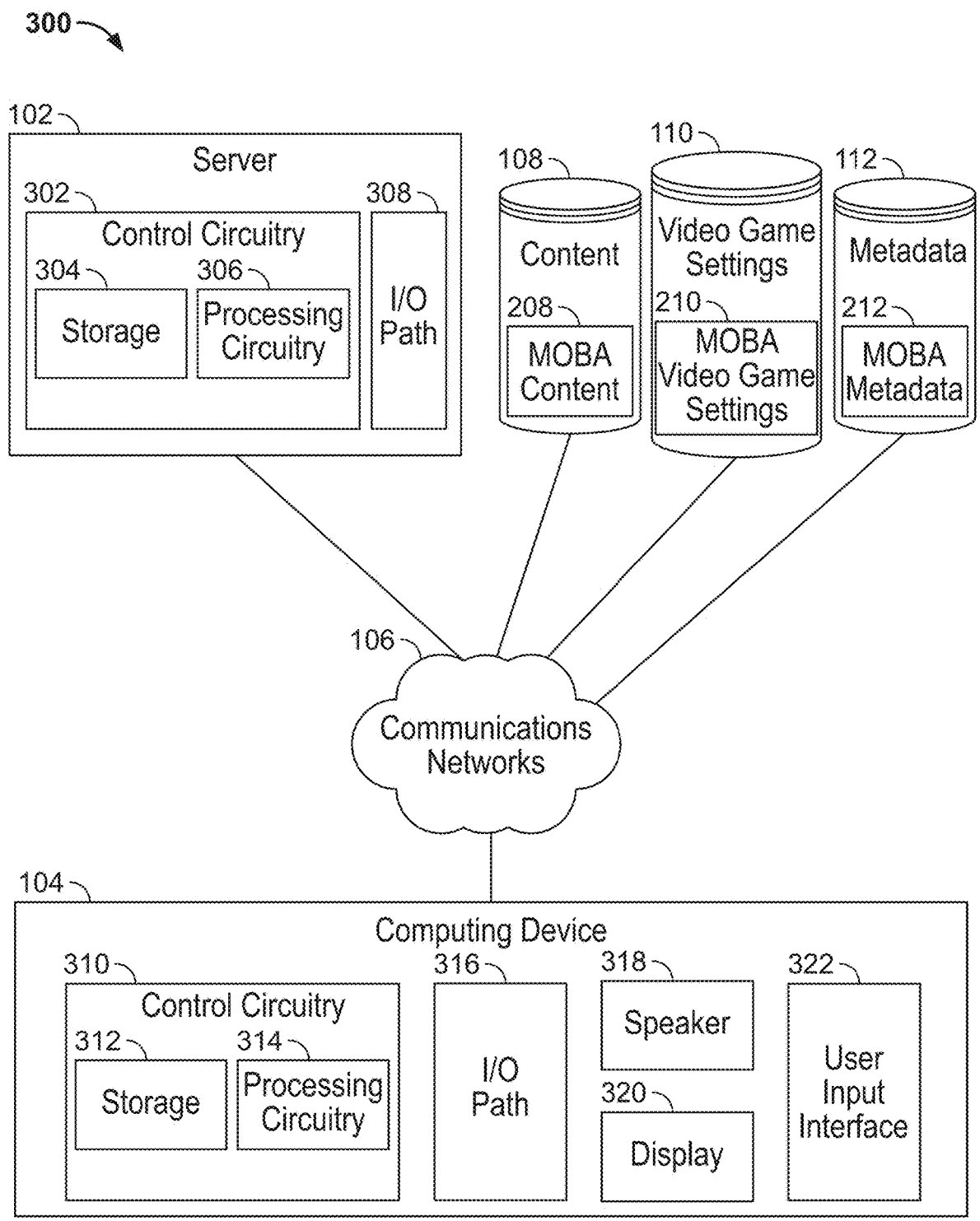
FIG. 3 is an illustrative block diagram showing additional details of the systems of FIG. 1 and/or FIG. 2, in accordance with some embodiments of the disclosure.

FIG. 3 is an illustrative block diagram showing additional details of system 100 (FIG. 1) and/or system 200 (FIG. 2), in accordance with some embodiments of the disclosure. In various embodiments, system 200 includes some components described above in connection with system 100. Although FIG. 3 shows certain numbers of components, in various examples, system 300 may include fewer than the illustrated components and/or multiples of one or more illustrated components. Server 102 includes control circuitry 302 and I/O path 308, and control circuitry 302 includes storage 304 and processing circuitry 306. Computing device 104, which may correspond to video gaming device 104 of FIG. 1 and FIG. 2, may be a gaming device, such as a video game console, user television equipment such as a set-top box, user computer equipment, a wireless user communications device such as a smartphone device, or any device on which video games may be played. Computing device 104 includes control circuitry 310, I/O path 316, speaker 318, display 320, and user input interface 322. Control circuitry 310 includes storage 312 and processing circuitry 314. Control circuitry 302 and/or 310 may be based on any suitable processing circuitry such as processing circuitry 306 and/or 314. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 304, storage 312, and/or storages of other components of system 300 (e.g., storages of content source 108, video game settings 110, metadata database 112, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 304, storage 312, and/or storages of other components of system 300 may be used to store various types of content, metadata, gaming data, media guidance data, and or other types of data. Non-volatile memory may also be used (e.g., to launch a boot-up routine and other instructions). Cloud-based storage may be used to supplement storages 304, 312 or instead of storages 304, 312. In some embodiments, control circuitry 302 and/or 310 executes instructions for an application stored in memory (e.g., storage 304 and/or 312). Specifically, control circuitry 302 and/or 310 may be instructed by the application to perform the functions discussed herein. In some implementations, any action performed by control circuitry 302 and/or 310 may be based on instructions received from the application. For example, the application may be implemented as software or a set of executable instructions that may be stored in storage 304 and/or 312 and executed by control circuitry 302 and/or 310. In some embodiments, the application may be a client/server application where only a client application resides on computing device 104, and a server application resides on server 102.

The application may be implemented using any suitable architecture. For example, it may be a stand-alone application wholly implemented on computing device 104. In such an approach, instructions for the application are stored locally (e.g., in storage 312), and data for use by the application is downloaded on a periodic basis (e.g., from an out-of-band feed, from an Internet resource, or using another suitable approach). Processing circuitry 314 may retrieve instructions for the application from storage 312 and process the instructions to perform the functionality described herein. Based on the processed instructions, processing circuitry 314 may determine what action to perform when input is received from user input interface 322.

In client/server-based embodiments, control circuitry 310 may include communication circuitry suitable for communicating with an application server (e.g., server 102) or other networks or servers. The instructions for carrying out the functionality described herein may be stored on the application server. Communication circuitry may include a cable modem, an integrated services digital network (ISDN) modem, a digital subscriber line (DSL) modem, a telephone modem, an Ethernet card, or a wireless modem for communication with other equipment, or any other suitable communication circuitry. Such communication may involve the Internet or any other suitable communication networks or paths (e.g., communication network 106). In another example of a client/server-based application, control circuitry 310 runs a web browser that interprets web pages provided by a remote server (e.g., server 102). For example, the remote server may store the instructions for the application in a storage device. The remote server may process the stored instructions using circuitry (e.g., control circuitry 302) and generate the displays discussed above and below. Computing device 104 may receive the displays generated by the remote server and may display the content of the displays locally via display 320. This way, the processing of the instructions is performed remotely (e.g., by server 102) while the resulting displays, such as the display windows described elsewhere herein, are provided locally on computing device 104. Computing device 104 may receive inputs from the user via input interface 322 and transmit those inputs to the remote server for processing and generating the corresponding displays.

A user may send instructions to control circuitry 302 and/or 310 using user input interface 322. User input interface 322 may be any suitable user interface, such as a gaming controller, a remote control, trackball, keypad, keyboard, touchscreen, touchpad, stylus input, joystick, voice recognition interface, or other user input interfaces. User input interface 322 may be integrated with or combined with display 320, which may be a monitor, a television, a liquid crystal display (LCD), an electronic ink display, or any other equipment suitable for displaying visual images.

Server 102 and computing device 104 may receive content and data via input/output (hereinafter "I/O") paths 308 and 316, respectively. For instance, I/O path 316 may include a communication port configured to receive a live content stream from server 102 and/or content source 108 via a communication network 106. Storage 312 may be configured to buffer the received live content stream for playback and display 320 may be configured to present the buffered content, navigation options, alerts, and/or the like via a primary display window and/or a secondary display window. I/O paths 308, 316 may provide content (e.g., a live stream of content, broadcast programming, on-demand programming, Internet content, content available over a local area network (LAN) or wide area network (WAN), and/or other content) and data to control circuitry 302, 310. Control circuitry 302, 310 may be used to send and receive commands, requests, and other suitable data using I/O paths 308, 316. I/O paths 308, 316 may connect control circuitry 302, 310 (and specifically processing circuitry 306, 314) to one or more communication paths (described below). I/O functions may be provided by one or more of these communication paths but are shown as single paths in FIG. 3 to avoid overcomplicating the drawing.

Content source 108 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc.; ABC is a trademark owned by the American Broadcasting Company, Inc.; and HBO is a trademark owned by the Home Box Office, Inc. Content source 108 may be the originator of content (e.g., a television broadcaster, a Webcast provider, etc.) or may not be the originator of content (e.g., an on-demand content provider, an Internet provider of content of broadcast programs for downloading, etc.). Content source 108 may include cable sources, satellite providers, on-demand providers, Internet providers, over-the-top content providers, or other providers of content. Content source 108 may also include a remote media server used to store different types of content (e.g., including video content selected by a user) in a location remote from computing device 104. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Content and/or data delivered to computing device 104 may be over-the-top (OTT) content. OTT content delivery allows Internet-enabled user devices, such as computing device 104, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may transfer only IP packets provided by the OTT content provider. Examples of OTT content providers include YOUTUBE, NETFLIX, and HULU, which provide audio and video via IP packets. YouTube is a trademark owned by Google LLC; Netflix is a trademark owned by Netflix, Inc.; and Hulu is a trademark owned by Hulu, LLC. OTT content providers may additionally or alternatively provide media guidance data described above. In addition to content and/or media guidance data, providers of OTT content can distribute applications (e.g., web-based applications or cloud-based applications), or the content can be displayed by applications stored on computing device 104.

Figure 4:
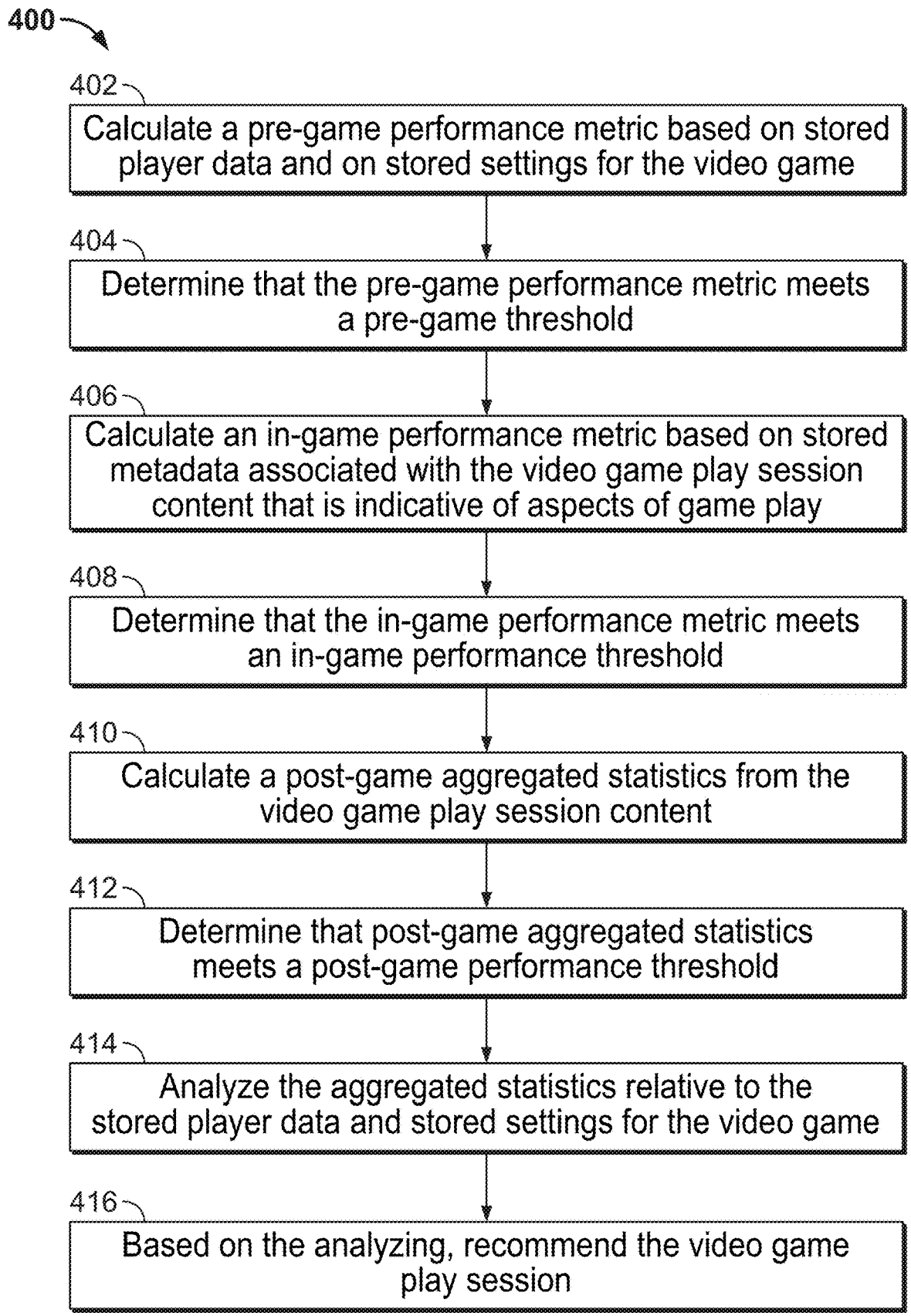
FIG. 4 is an illustrative flow chart of a process for recommending video game play session content for a video game, in accordance with some embodiments of the disclosure.

Having described system 100, reference is now made to FIG. 4, which depicts an illustrative flowchart of process 400 for recommending content for a video game that may be implemented by using system 300, in accordance with some embodiments of the disclosure. In various embodiments, individual steps of process 400, or any process described herein, may be implemented by one or more components of system 300. Although the present disclosure may describe certain steps of process 400 (and of other processes described herein) as being implemented by certain components of system 300, this is for purposes of illustration only, and it should be understood that other components of system 300 may implement those steps instead.

At step 402, control circuitry 302 calculates a pre-game performance metric based on stored player data and on stored settings for the video game. The pre-game performance metric measures performance of the teams with respect to their skills. In one example, the video game is a MOBA video game and the stored settings include MOBA video game settings. In one example the stored player data includes skills of each of the players. Such skills in the MOBA video game includes power skills, defense skills, attack skills, damage skills, healing skills, control skills etc. In one example, stored player data includes ability power (AP) scores such as AP defense (AP Def) score, ability power attack (APA) score, attack damage (AD) score, attack damage defense (AD Def) score, crowd control (CC) scores such as CC Done score, CC defense (CC Def) score, healing score etc. of each of the players of the teams. At step 404, the control circuitry 302 determines that the pre-game performance metric meets a pre-game threshold. In one embodiment, the pre-game threshold is pre-determined based on pre-game performance metrics measured for the games that were previously played with the same teams. In one embodiment, steps 402 and 404 are part of the pre-game analysis performed by the control circuitry 302 additional details of which are provided below in connection with FIG. 5.

At step 406, in response to determining that the pre-game performance metric meets the pre-game threshold, the control circuitry 302 calculates an in-game performance metric based on stored metadata associated with the video game play session content that is indicative of aspects of game play. The in-game performance metric measures performance of the teams with respect to their skills during the actual game play. At step 408, the control circuitry determines that the in-game performance metric meets an in-game performance threshold. In one embodiment, the in-game performance threshold is pre-determined based on video analysis of the games that were played by the same players with the same teams. In one embodiment, steps 406 and 408 are part of the in-game analysis performed by the control circuitry 302 additional details of which are provided below in connection with FIG. 6.

At step 410, the control circuitry 302 calculates a post-game aggregated statistics from the video game play session content. In one embodiment, the aggregated statistics are calculated by combining the in-game metrics of each players determined during in-game analysis of the video game play session. At step 412, the control circuitry determines that the post-game aggregated statistics meets a post-game threshold. At step 414, the control circuitry 302 analyzes the aggregated statistics relative to the stored player data and stored settings for the video game. In one embodiment, the control circuitry 302 analyzes the aggregated statistics of in-game analysis with the aggregated statistics of the pre-game analysis stored in the player data. At step 416 based on the analyzing, the control circuitry 302 determines whether the video game play session content is to be recommended. In one embodiment, the control circuitry 302 determines that the aggregated in-game analysis is approximately same as the aggregated pre-game analysis. In one embodiment, steps 410, 412, 414 and 416 are part of the post-game analysis performed by the control circuitry 302 additional details of which are provided below in connection with FIG. 7.

Figure 5:
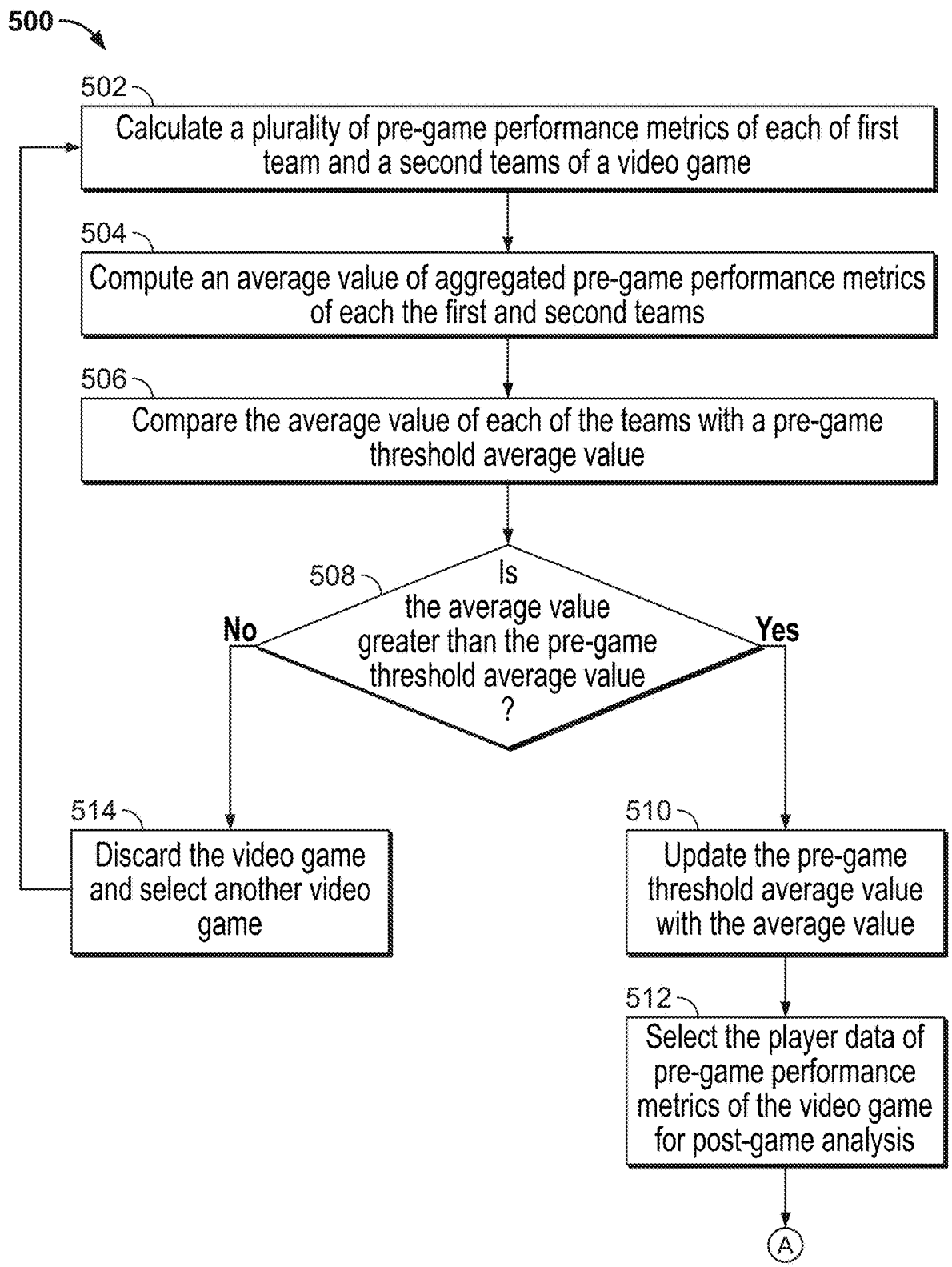
FIG. 5 is an illustrative flowchart of pre-game analysis of analyzing data of the video game content prior to video game play, in accordance with some embodiments of the disclosure.
Figure 9:
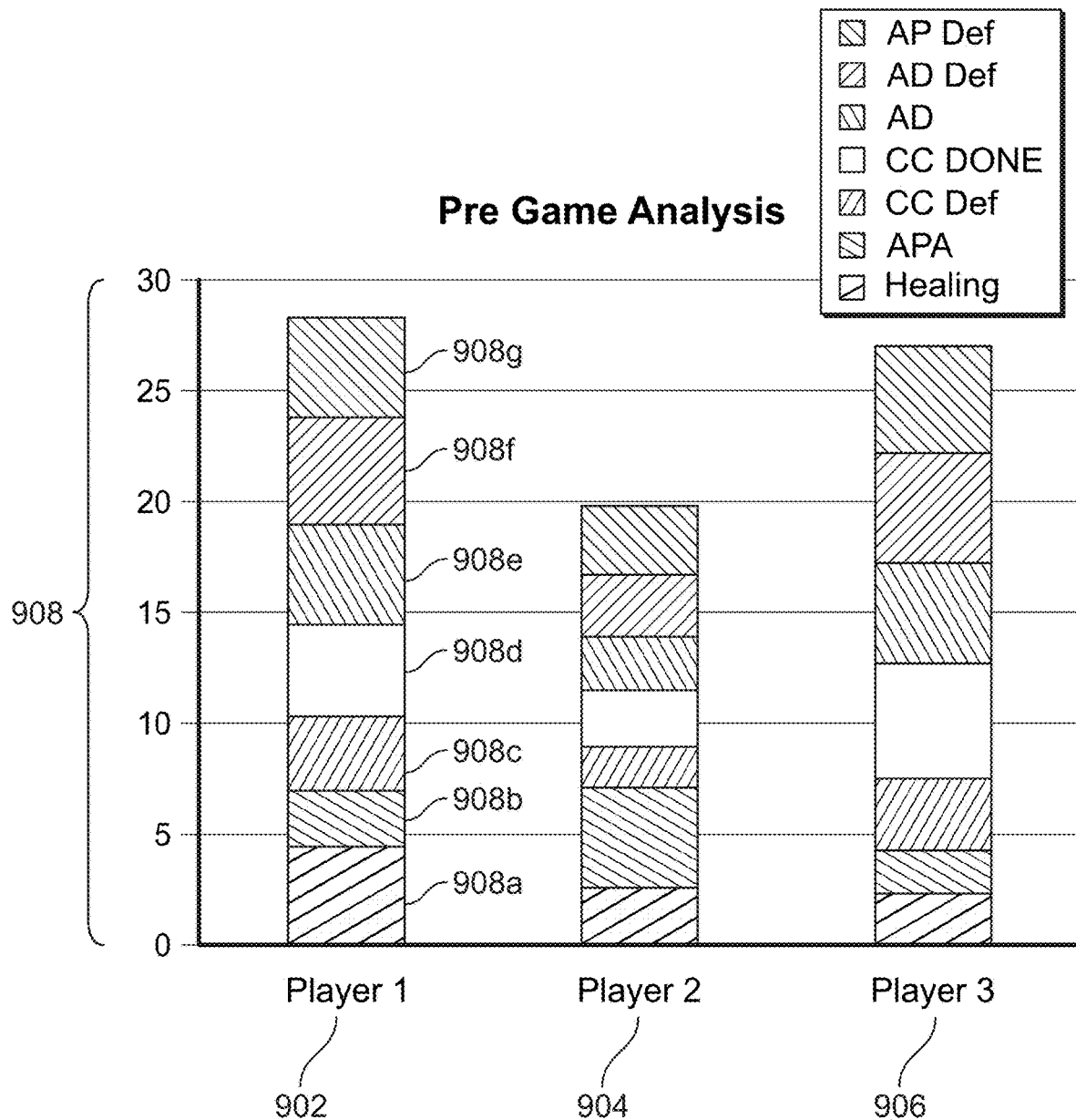
FIG. 9 illustrates an example of graph structure of pre-game metrics of pre-game analysis of the video game, in accordance with some embodiments of the disclosure.

FIG. 5 depicts an illustrative flowchart of a process 500 for performing the pre-game analysis of a video game in accordance with some embodiments of the disclosure. Process 500, in various embodiments, may correspond to steps 402 and 404 of FIG. 4. At step 502, the system calculates a pre-game performance metric of each of a first team and a second team of a video game. An example of the pre-game performance metrics of each team is shown in FIG. 8. FIG. 8 illustrates a table 800, which includes team A 802 and team B 804. The table 800 also includes a plurality of scores 806 such as defense score, crowd control (CC) score, ability power (AP) score, attack damage (AD) score indicative of the pre-game performance metric of each of the team A 802 and team B 804. As shown, the scores 806 of team A 802 are approximately equivalent to the scores 806 of team B 804. In one embodiment, the pre-game performance metric is determined based on the stored player data. An example of the stored player data includes aggregated pre-game metrics for each player in the team A 802 as illustrated in FIG. 9. FIG. 9 depicts a graph 900 illustrating pre-game analysis of three players of team A 802. As shown, the x-axis includes the three players, player 1 902, player 2 904 and player 3 906 and y-axis illustrates the scores of the pre-game metrics 908. As shown the aggregated pre-game metric score includes AP Def score 908a, AD Def score 908b, attack damage (AD) score 908c, CC Done score 908d, CC Def score 908e, APA score 908f and healing score 908g of each of the player 1, 902, player 2 904 and player 3 906. Although, not shown, a similar graph can be generated illustrating pre-game performance of the three players of team B 804.

At step 504, the system computes an average value of aggregated pre-game performance metrics of each of the first and the second teams. For example, the average value 808 of the each of the team A 802 and team B 804 is determined to be 8 i.e. as illustrated in FIG. 8. At step 506, the system compares this average value of each of the teams with a pre-game threshold average value. The pre-game threshold average value is pre-determined based on pre-game performance metrics measured for the games that were previously played with the same teams. At step 508, it is determined whether the average value is greater than a pre-game threshold average value.

In one embodiment, if at step 506, it is determined that the average value is greater than the pre-game threshold average value, then, the pre-game threshold average value is updated with the average value at step 510. At step 512, the control circuitry selects the stored player data of the pre-game performance metrics of the video game for post-game analysis. In one example, the stored player data selected is the aggregated pre-game metrics 908 illustrated in FIG. 9.

In one embodiment, if at step 508, it is determined that the average value is not greater than the pre-game threshold average value, then at step 514, the video game is discarded and another video-game is selected for performing a pre-game analysis repeating from step 502. Accordingly, pre-game analysis of the video game is trained over time on different videos of the same game and database is updated with the updated pre-game threshold average values.

Figure 6:
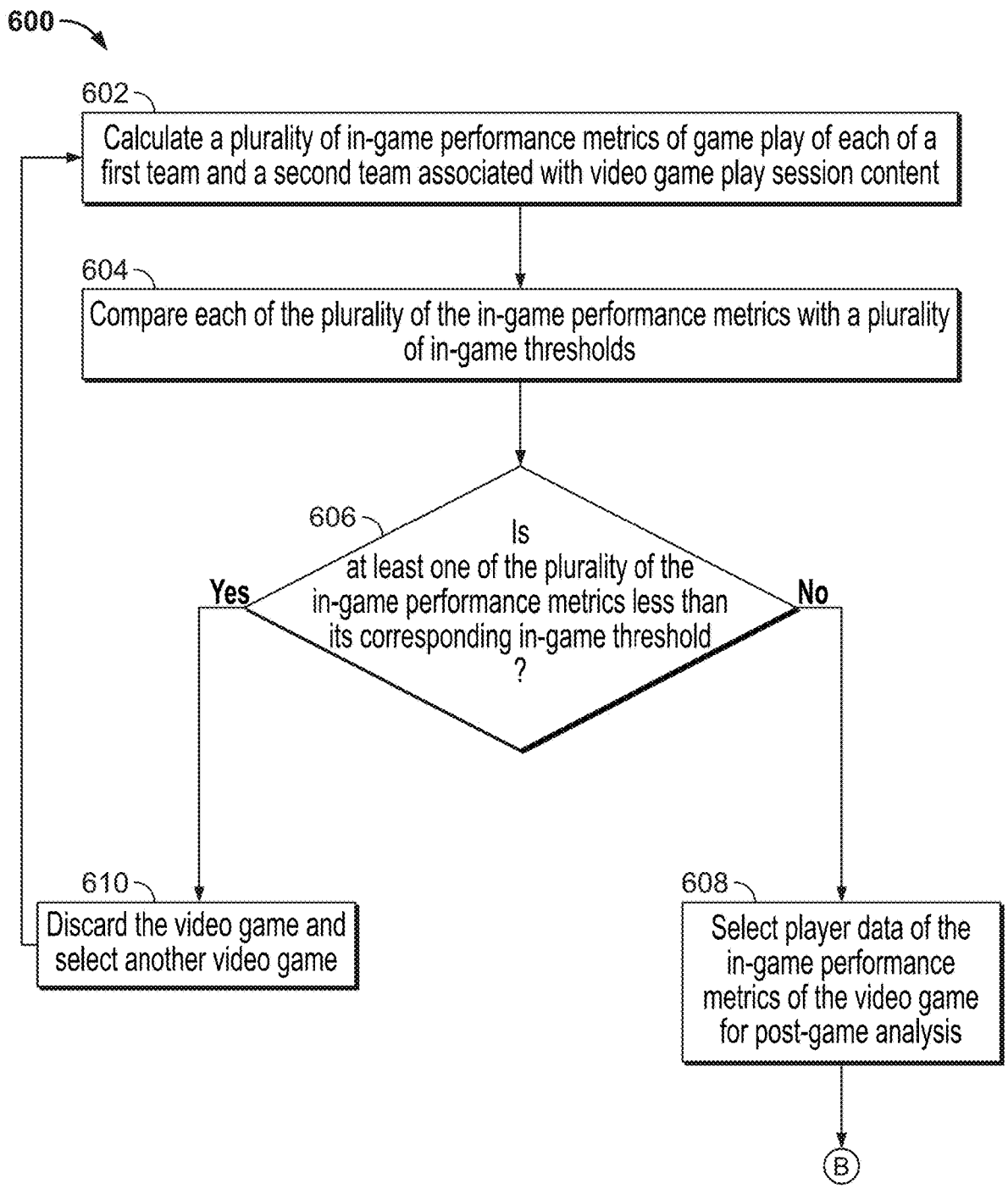
FIG. 6 is an illustrative flowchart of in-game analysis of analyzing data of the video game content during video game play session, in accordance with some embodiments of the disclosure.

FIG. 6 depicts an illustrative flowchart of a process 600 for performing an in-game analysis of a video game in accordance with some embodiments of the disclosure. Process 600, in various embodiments, may correspond to steps 406 and 408 of FIG. 4. At step 602, the control circuitry 302 calculates an in-game performance metric of a game play of each of the first team and a second team of a video game. The in-game performance metric measures game performance of the teams with respect to their skills during the actual game play session during time intervals. As discussed above, in one example, the in-game performance metric for each is determined based on game map and parameters stored in the metadata of the MOBA video game. Some of the parameters include character positioning (CP), route followed (RF), reaction time (RT), objective captured (OC), time elapsed in objective capturing (TOC), target destroyed (TD), minion management (MM), team fight (TF), and advanced techniques (AT). In one example, character positioning is analyzed as soon as the game starts for both the team and a chart prepared to compare the positioning. In one example, route is followed to determine strategy of each of the teams. In one example, reaction time includes time taken to reach to objectives and participate in fights. Time for both the teams may be calculated and compared. A best game may be where both the teams have reached the place/fights with comparable time so that they can fight to claim advantage. In one example, objective captured is number of objectives that were captured. In one example, objective captured is amount of time taken to capture an objective. In one example, target destroyed includes number of enemy targets destroyed and time taken to destroy the target. In one embodiment, the time taken to destroy the targets are calculated for both teams and compared to identify optimal time. In one example, the minion management includes minion spawn and minion target. In one example, team fight includes ability of each team regarding attacks. In one example advanced techniques include execution of a particular task in the game.

In one embodiment, the control circuitry 302 utilizes the parameters and the game map to analyze game progression during the MOBA video game session. In one example, the game map includes the location of targets and objectives (that are spawned at a particular time), different routes/paths to reach that target/objective. Such targets are towers that need protection while playing game. If the main tower is destroyed, game is over. Each team needs to protect their tower while attacking the opponent tower. The objectives are special items that are spawned at a particular time and capturing them gives an advantage to the team that has captured it. Thus, in route analysis, the video game analysis is mainly concentrated on what route a player has taken while reaching the target/objective. Since there are multiple routes to the target/objective a best game will be determined in which the players have taken the best route to the target/objective based on their current position. In another example, each MOBA video game includes objectives that are special items that are spawned at a particular time and capturing them gives an advantage to the to the team that has captured it. During the in-game analysis, the efficiency with which each team has reached the objective and captured the objective is analyzed. For example, an objective is going to spawn soon, and both the team are aware of this. Each of the teams is to reach the place and capture it as soon as possible. Data will be collected based on how individual team has played while reaching and capturing that objective. Such data includes how the players have tackled the current engagement (fight in progress), which route is taken to reach the objective, how team has collaborated (strategy) and capture the target, what formation is used around the target and time take to reach and capture the target. Thus, the control circuitry 302 calculates the in-game performance metric based on this analysis associated with the video game play session content that is indicative of aspects of game play. Some examples of the in-game performance metrics include in-game damage metrics, in-game attack metrics, in-game defense metrics, in-game crowd control metrics, in-game global ability metrics etc.

An example of the in-game performance metrics of each team is shown in FIG. 10A. FIG. 10A illustrates a table 1000, which includes the team A 802 and the team B 804. The table 1000 also includes time interval (time) 1004 and a plurality of scores 1006 such as CP score, RF score, RT score, OC score, TOC score, TD score, MM score, TF score and AT score indicative of the in-game performance metric of each of the team A 802 and team B 804 during each time interval (time) 1004. An example of time interval 1004 is 10 minutes. An average score 1008 is also calculated for each of the team A 802 and team B 804 during each time 1004. As shown, the scores 1006 of team A 802 are approximately equivalent to the scores 1006 of team B 804 during each of the time intervals. Also, the average score 1008 of team A 802 is approximately equivaled to the average score 1008 of team B 804 during each of the time intervals. Thus, in-game performance metric measures game performance of the teams with respect to their skills during the actual game play session during each of the time intervals.

Figures 10B, 10C:
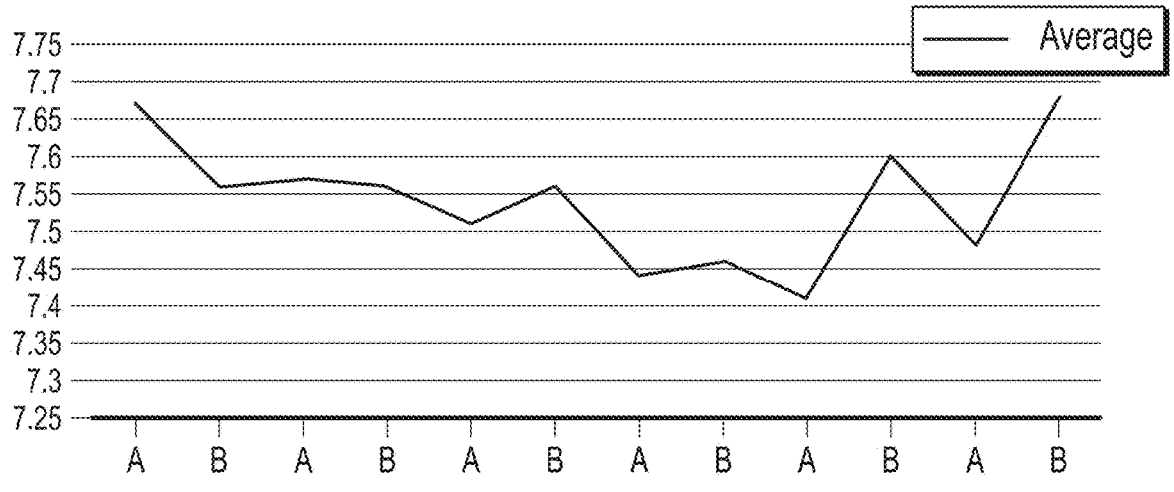
FIG. 10B illustrates an example of a table structure of aggregated in-game performance metrics of the in-game performance metrics of FIG. 10A.
FIG. 10C illustrates an example of a graph structure of aggregated in-game performance metrics of the in-game performance metrics of FIG. 10A.

In one embodiment, an average of the video game progression in a time interval 1004 (e.g. 10 mins) is computed. FIG. 10B illustrates a table 1020, which includes the average score 1022 of the team A 802 and the average score 1024 of team B 804, the time 1004 and average/median score 1026 of the game. The average score 1022 of each of the teams A 802 and B 804 is calculated using the average scores 1008 of the teams A 802 and B 804 respectively from the table 1000 in FIG. 10A. The average/median score 1026 is calculated using the average scores 1022 and 1024 of each of the teams A 802 and B 804, respectively. In one embodiment, an adequate information about duration when the game was most exciting is determined by the average/median score 106. Thus, a better prediction of the quality of the game is determined, which is utilized to recommend the video game. FIG. 10C depicts a graph 1030 illustrating in-game analysis of the team A 802 and team B 804. As shown, the x-axis includes the team A 802 and team B 804 and y-axis includes their respective average scores 1022 and 1024 during each of the times 1004.

At step 604, the control circuitry 302 compares each of the in-game performance metrics with its corresponding in-game threshold among the plurality of in-game thresholds. The in-game thresholds are pre-determined based on video analysis of the games that were played by the same players with the same teams. For example, an in-game threshold for the MOBA video game includes route analysis threshold. In another example, an in-game threshold for the MOBA video game includes object capture threshold. At step 606, it is determined whether at least one of the in-game performance metrics less than its corresponding in-game thresholds. If it is determined that none of the in-game performance metrics is less than its corresponding in-game threshold, then player data of the in-game performance metrics of the video game is selected for post-game analysis at step 608. In one embodiment, if at step 606, it is determined that at least one of the in-game performance metrics less than its corresponding in-game threshold, then the video game is discarded and another video game is selected for performing in-game analysis repeating from step 602. Accordingly, in-game analysis of the video game is trained over time on different video of the same game to select the video game for the post-game analysis.

Figure 7:
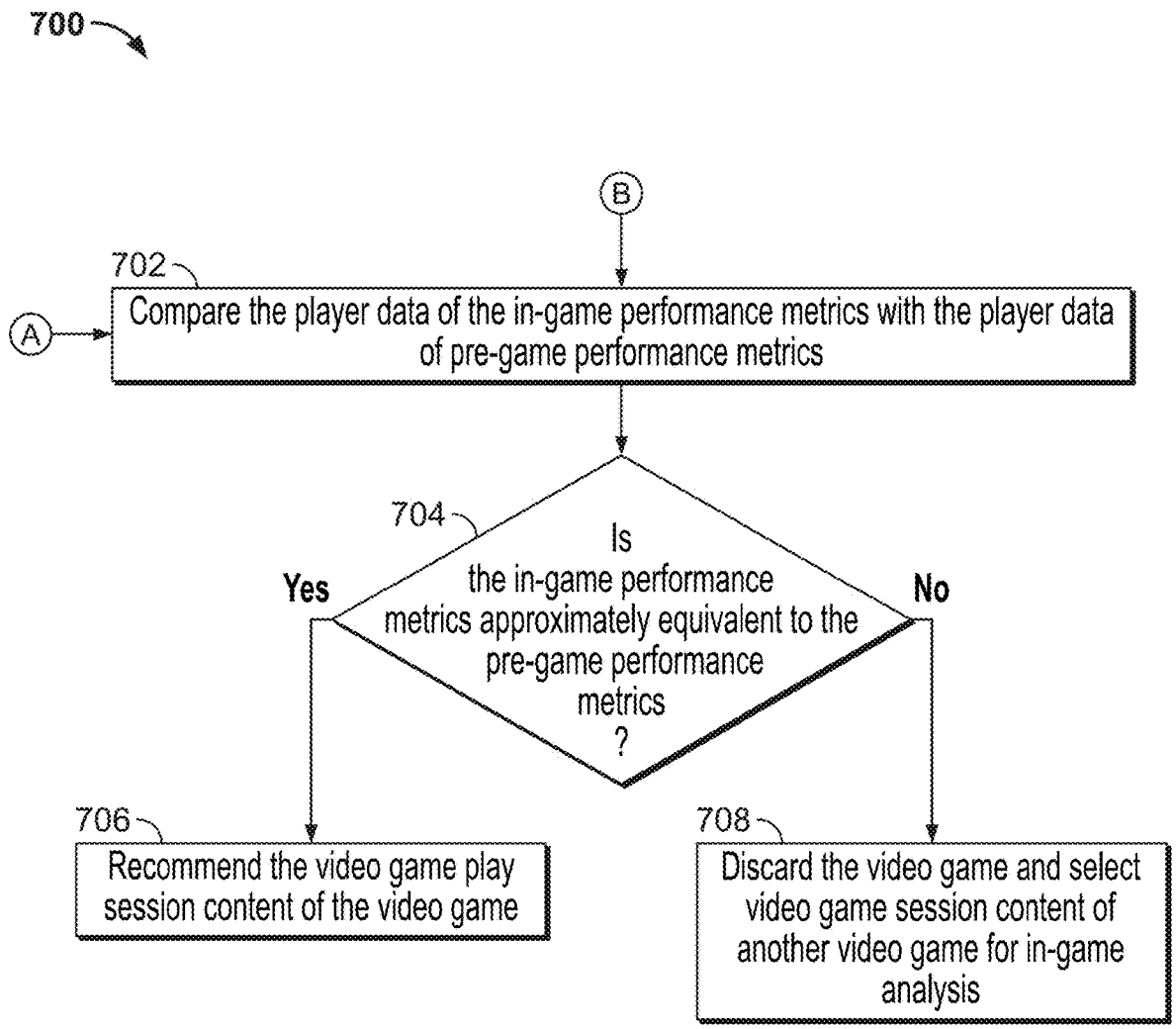
FIG. 7 is an illustrative flowchart of post-game analysis of analyzing results of the in-game analysis to recommend video game play session content for the video game, in accordance with some embodiments of the disclosure.

FIG. 7 depicts an illustrative flowchart of process 700 for performing a post-game analysis of a video game in accordance with some embodiments of the disclosure. Process 700 in various embodiments, may correspond to steps 410, 412, 414 and 416 of FIG. 4.

Figure 11A:
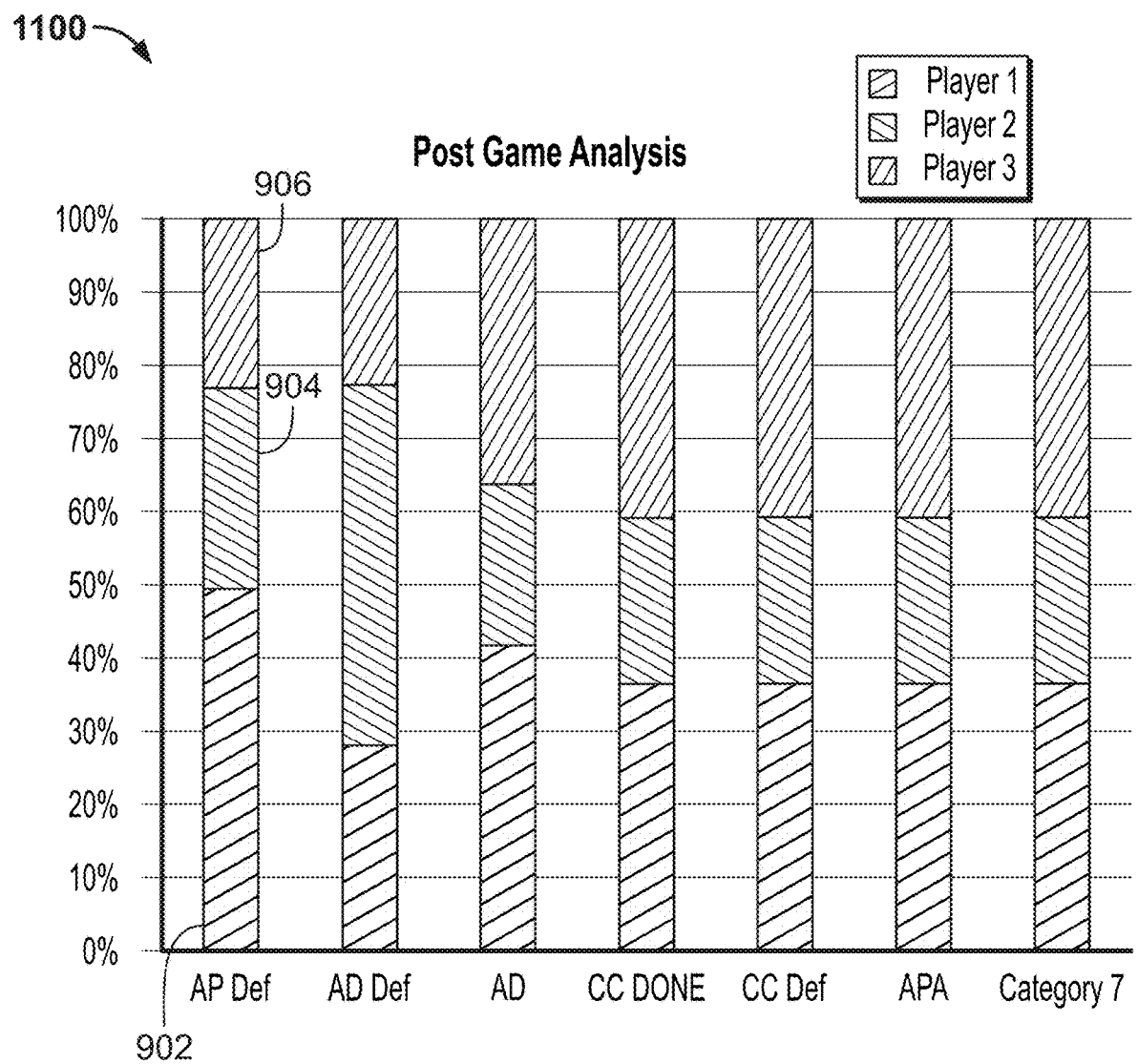
FIG. 11A shows an example of graph structure of post-game performance metrics of players in the post-game analysis of the video game, in accordance with some embodiments of the disclosure.

At step 704, compare player data of the in-game performance metrics with player data of the pre-game performance metrics. An example of the post-game analysis of the three players is shown in graph FIG. 11A. FIG. 11A shows a graph 1100. The y-axis discloses a percentage of each of the scores AP Def score 1108a, AD Def score 1108b, attack damage (AD) score 1108c, CC Done score 1108d, CC Def score 1108e, APA score 1108f and healing score 1108g of each of the player 1, 902, player 2 904 and player 3 906. The in-game metrics of the players is used in the post-game analysis. An example of the post-game analysis of each player in the first team utilizing data from scores in FIG. 11A is shown in graph 1100 in FIG. 11B. The graph 1100 of the aggregated metrics of each player in the first team is generated by combining the data of the metrics of the graph 1000 in FIG. 11A. The graph 1100 shows the aggregated metrics of three players of team A 802. As shown, the x-axis includes the three players, player 1 902, player 2 904 and player 3 906 and y-axis illustrates the scores of the metrics 1108. As shown the aggregated metrics score includes AP Def score 1108a, AD Def score 1108b, attack damage (AD) score 1108c, CC Done score 1108d, CC Def score 1108e, APA score 1108f and healing score 1108g of each of the player 1, 902, player 2 904 and player 3 906. Although, not shown, a similar graph can be generated illustrating the post-game analysis of the three players of team B 804.

An example of post-game analysis of each teams is shown in FIG. 11C. FIG. 11C illustrates a table 1130, which includes the team A 802 and team B 804. The table 1130 also includes a plurality of scores 1136 such as AP def score, AD Def score, AD score, CC done score, CC Def score and Healing score indicative of the performance metric of each of the team A 802 and team B 804. As shown, the average scores 1138 of team A 802 are relatively equivalent to the scores 1138 of team B 804. In one embodiment, the video game content of this game would be considered a compelling game play for recommendation.

Figure 11B:
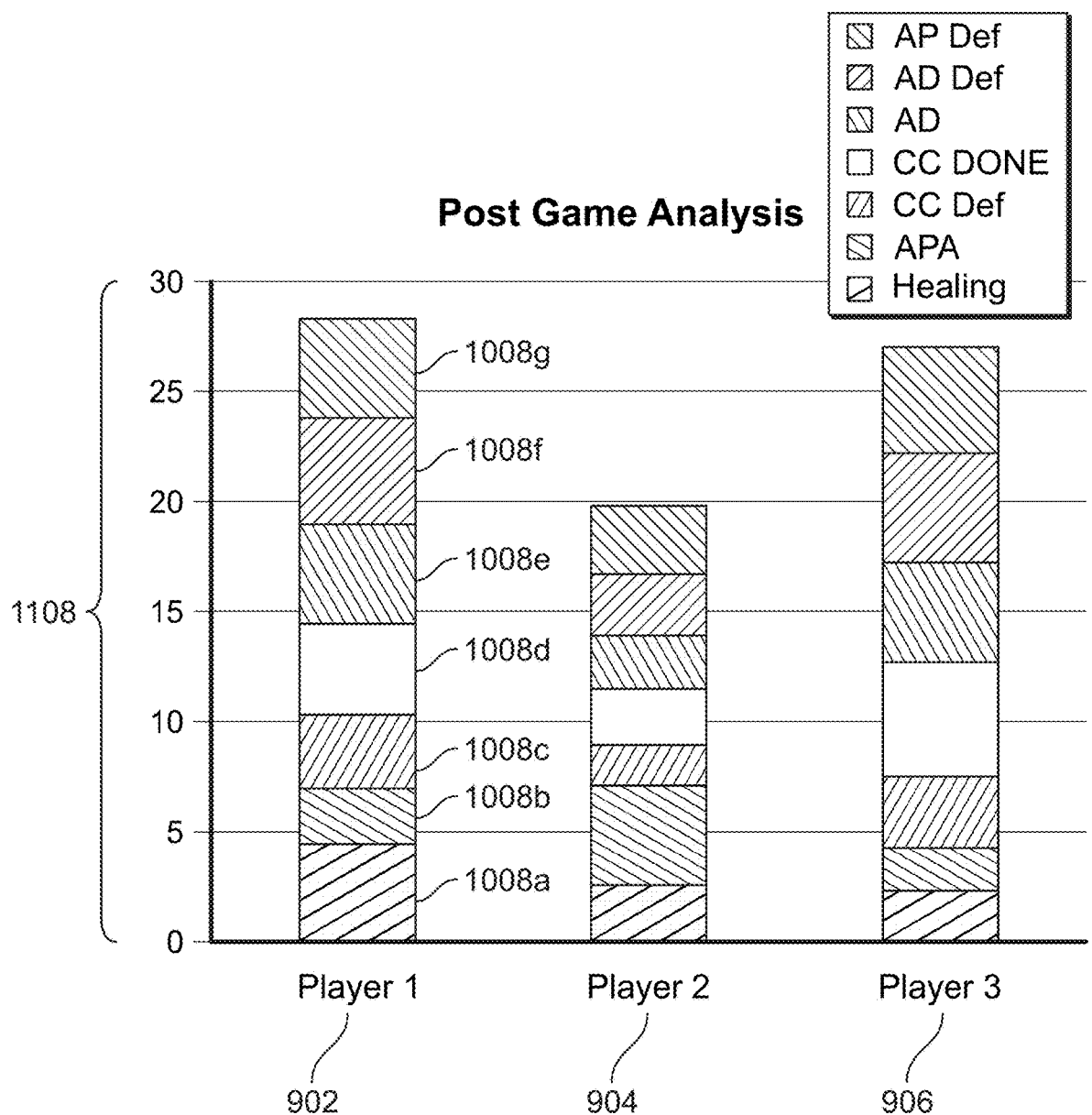
FIG. 11B shows an example of a graph structure of aggregated post-game performance metrics of players in post-game analysis of the video game in accordance with some embodiments of the disclosure.

At step 704, it is determined whether the in-game performance metrics is approximately equivalent to the pre-game performance metrics. In one example, the post-game analysis of each of the teams as shown in FIG. 11C is used to determine whether the in-game performance metrics is approximately equivalent to the pre-game performance metrics. In one example, the post-game analysis of each of the players as shown in FIG. 11B is used to determine whether the in-game performance metrics is approximately equivalent to the pre-game performance metrics. If at step 706, it is determined that the in-game performance metrics is approximately equivalent to the pre-game performance metrics, then the video game play session content of the video game is recommended at step 708. If at step 706 it is determined that the in-game performance metrics is not approximately equivalent to the pre-game performance metrics, then at step 710, the video game is discarded and the in-game analysis of video game session content of another video game is selected for in-game analysis. Accordingly, post-game analysis of the video game is trained over time on different video of the same game to select the video game play session of the video game for recommendation.

FIG. 12 is your flowchart of process 1200 for recommending content for a video game that may be implemented by using system 300, in accordance with some embodiments of the disclosure. In various embodiments, individual steps of process 1200, or any process described herein, may be implemented by one or more components of system 300. Although the present disclosure may describe certain steps of process 1200 (and of other processes described herein) as being implemented by certain components of system 300, this is for purposes of illustration only, and it should be understood that other components of system 300 may implement those steps instead.

At step 1202, the control circuitry 304 analyzes stored player data for each player of each team associated with the video game play session and stored settings for the MOBA video game. In one embodiment, the player data includes metrics related to attack metrics, defense metrics, and damage metrics to determine to evaluate the video game play session content. As discussed above, the player data includes pre-game metrics of each of the players in each of the teams. In one embodiment, the step 1202 of analyzing stored data is performed by the control circuitry 302 additional details of which are provided below in connection with FIG. 13. At step 1204, the control circuitry 304 analyzes an in-game performance of each player of each team in the video game play session content based on a game map of the video game play session content and on in-game metrics for each player of each team determined from the video game play session content. The in-game metrics includes in-game attack metrics, in-game defense metrics, and in-game damage metrics. In one embodiment, the in-game performance is the in-game metrics discussed in detail above. In one embodiment, the step 1204 of analyzing in-game performance is performed by the control circuitry 302 additional details of which are provided below in connection with FIG. 14. At step 1206, the control circuitry 304 analyzes the aggregated performance metrics after end of the video game play session to determine post-game metrics in terms of player data for evaluation of the video game session content. In one example, the player data includes attack, defense, and damage metrics. In one example, the stored player data indicates that the player 1 killed 20 dragons in 30 minutes and thus would find the game interesting. In one example, the in-game performance indicates that the player 1 killed 19 dragons in 30 minutes and thus this would be also considered to be good game and the control circuitry 304 would recommend a user to watch the video of the MOBA video game play. At step 1208, the control circuitry 304 recommends the video game play session content based on the in-game performance of each player of each team.

Figure 13:
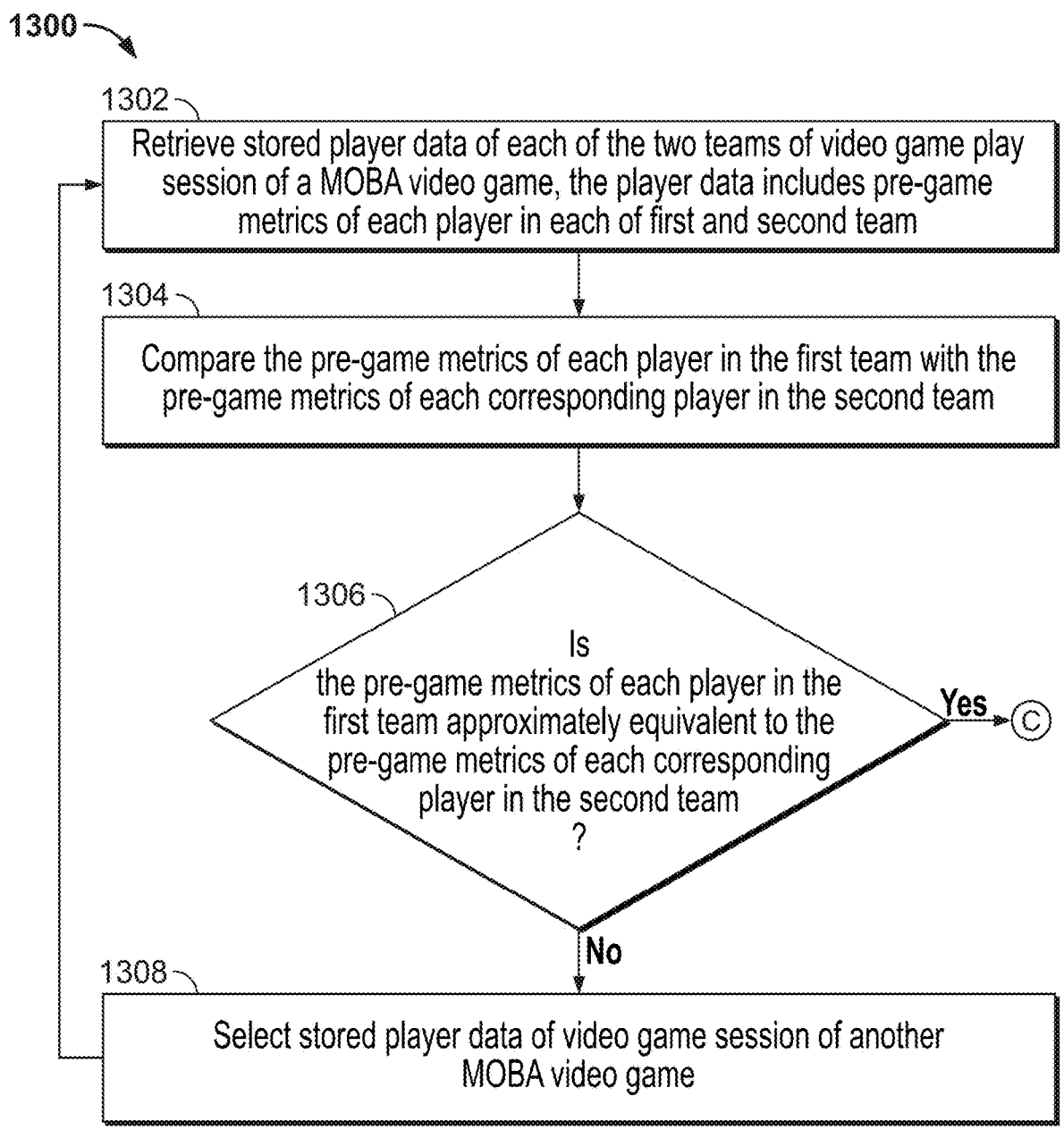
FIG. 13 is an illustrative flowchart of a process for analyzing data of the video game content prior to video game play, in accordance with some embodiments of the disclosure.

FIG. 13 depicts an illustrative flowchart of a process 1300 for analyzing stored data in pre-game analysis in accordance with some embodiments of the disclosure. Process 1300, in various embodiments, may correspond to step 1202 of FIG. 12

At step 1302, the control circuitry 304 retrieves stored player of each of the two teams of the video game play session of the MOBA video game. The player data includes pre-game metrics of each player in each of the first and the second teams. For example, the player data is the pre-game metrics of each of the three players in the first team as illustrated in the graph in FIG. 9. At step 1304, the control circuitry, compares the pre-game metrics of each of the players in the first team with the pre-game metrics of each player in the second team. At step 1306 it is determined whether the pre-game metrics of each of the players in the first team is equivalent to the pre-game metrics of each player in the second team. If at step 1306, it is determined that the pre-game metrics of each of the players in the first team is equivalent to the pre-game metrics of each player in the second team then the process 1300 leads to in-game analysis where the pre-game metrics of each player is compared to the in-game metrics. If however, at step 1306, it is determined that the pre-game metrics of each of the players in the first team is not equivalent to the pre-game metrics of each player in the second team, then at step 1308, the control circuitry selects stored player data of video game session of another MOBA video game and process 1300 is repeated starting at step 1302. Accordingly, pre-game analysis of the video game is trained over time on different video of the same game to select the stored player data of the video game content for the in-game analysis.

Figure 14:
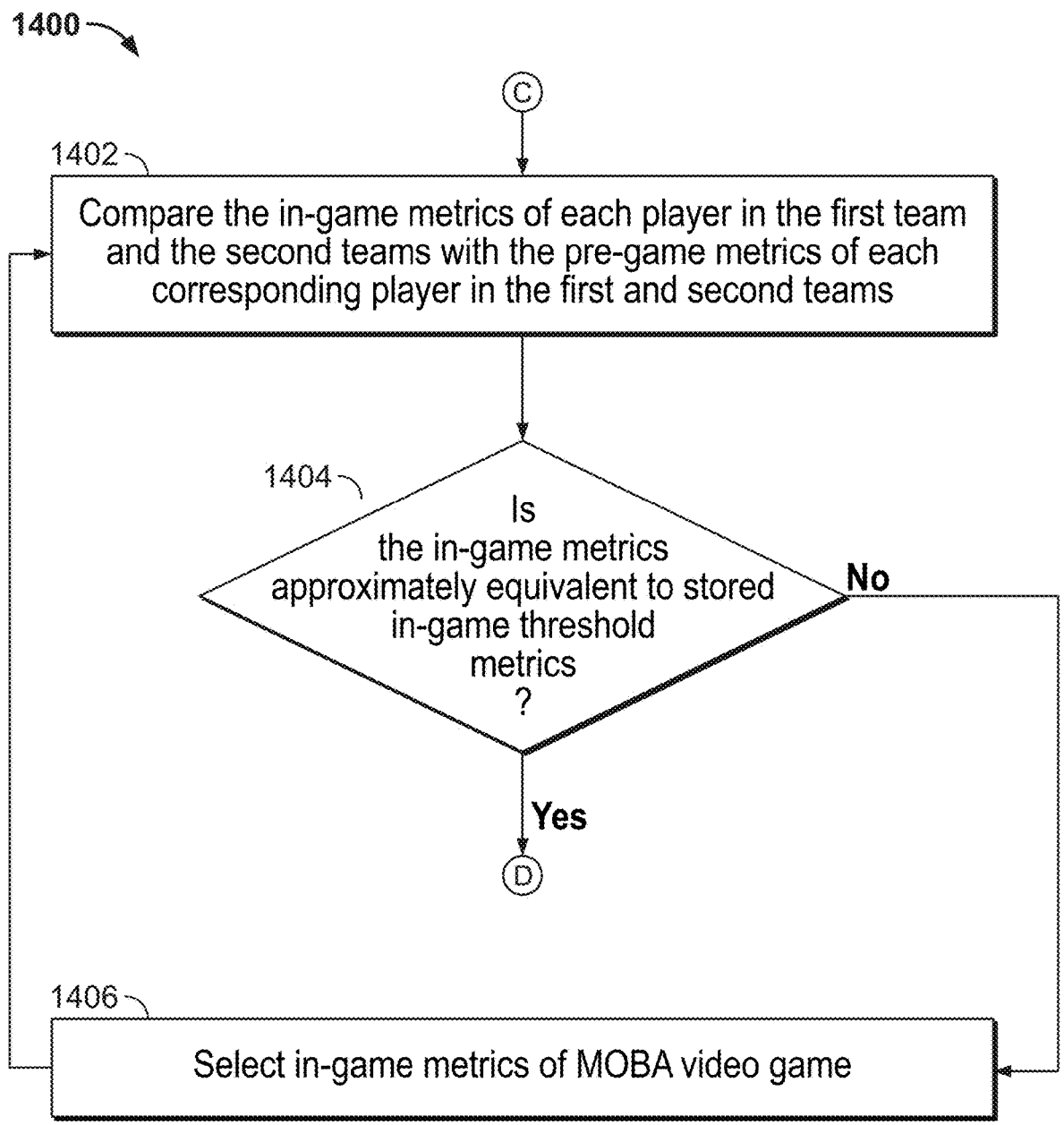
FIG. 14 is an illustrative flowchart of in-game analysis of analyzing data of the video game content during video game play session, in accordance with some embodiments of the disclosure.

FIG. 14 depicts an illustrative flowchart of a process 1400 for analyzing in-game performance in in-game analysis in accordance with some embodiments of the disclosure. Process 1400, in various embodiments, may correspond to step 1204 of FIG. 12

At step 1402, the control circuitry 304 compares the in-game metrics of each player in the first team and the second teams with the pre-game metrics of each corresponding player in the first and the second teams. In one example, such comparison is executed during post-game analysis as discussed above with respect to FIGS. 11A, 11B and 11C. At step 1404, it is determined whether the in-game metrics is approximately equivalent to stored in-game threshold metrics. It at step 1404, it is determined that the in-game metrics is approximately equivalent to the stored in-game threshold metrics process 1400 leads to further post-game analysis. If at step 1404, it is determined that the in-game metrics is not approximately equivalent to the stored in-game threshold metrics, then at step 1406, the control circuitry 304 selects in-game metrics of another MOBA video game and process 1400 is repeated starting at step 1402. Accordingly, in-game analysis of the video game is trained over time on different video of the same game to select in-game metrics of the video game play session content to recommend the video game play session content of the MOBA video game.

Figure 15:
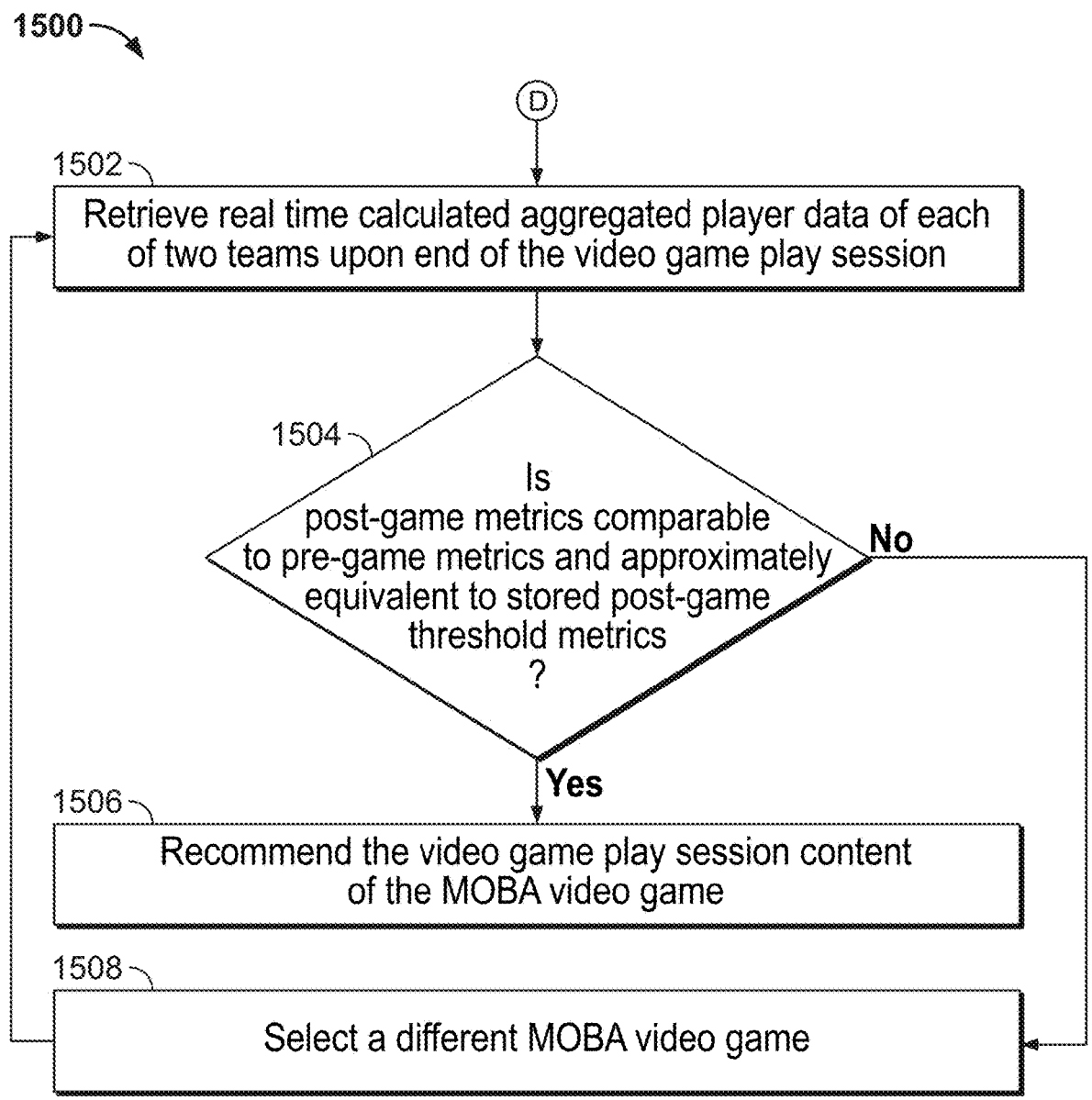
FIG. 15 is an illustrative flowchart of post-game analysis of analyzing data of the video game content, in accordance with some embodiments of the disclosure.

FIG. 15 depicts an illustrative flowchart of a process 1500 of post-game analysis of analyzing data of the video game content in accordance with some embodiments of the disclosure.

At step 1502, the control circuitry 304 retrieves real time calculated aggregated player data of each of two teams upon end of the video game play session. At step 1504, it is determined whether the post-game metrics is comparable to pre-game metrics and approximately equivalent to stored post-game threshold metrics. If at step 1504, it is determined that the post-game metrics is comparable to pre-game metrics and approximately equivalent to stored post-game threshold metrics, then at step 1506, the video game play session content of the MOBA video game is recommended. However, it at step 1504, it is determined that the post-game metrics is not comparable to pre-game metrics and not approximately equivalent to the stored post-game threshold metrics, then at step 1508, a different MOBA video game is selected and process 1500 is repeated starting at step 1502.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method for automatically recommending for display video game play session content of a video game, the method comprising:
    accessing a database of stored pre-game performance metrics for the video game;
    determining that a pre-game performance metric of a stored player game play session of a plurality of stored game play sessions of the video game meets a pre-game threshold based on stored player data for the video game;
    receiving at least one game play input, via a user interface, corresponding to the video game play session, the input received via at least one of: a video game controller, a keyboard, or a mouse;
    in response to determining that the pre-game performance metric of the stored player game play session meets the pre-game threshold, calculating an in-game performance metric based on the at least one received game play input and stored metadata associated with the video game play session content that is indicative of aspects of game play;
    determining that the in-game performance metric meets an in-game performance threshold;
    in response to determining that the in-game performance metric meets the in-game performance threshold, determining aggregated statistics from the video game play session content based on the at least one received game play input;
    analyzing the aggregated statistics relative to the stored player data and stored settings for the video game, wherein the analyzing comprises comparing the in-game performance metrics with the pre-game performance metrics and calculating an average score associated with the in-game performance metrics to determine the quality of the video game play session; and
    based on the analyzing, automatically generating for display a recommendation to view a segment of the video game play session.

2. The computer-implemented method of claim 1, further comprising determining a genre of the video game.

3. The computer-implemented method of claim 2, further comprising calculating the pre-game performance metric and post-game performance metric based on the genre.

4. The computer-implemented method of claim 1, wherein the determining that the pre-game performance metric meets the pre-game threshold comprises:
    calculating a plurality of pre-game performance metrics of each member of a first team and for each member of a second team;
    computing an average value of the pre-game performance metrics of each of the first and the second teams; and
    comparing the average value with an average pre-game threshold value of the pre-game threshold.

5. The computer-implemented method of claim 4, further comprising:
    determining that the average value is greater than the average pre-game threshold value; and
    in response to determining that the average value is greater than the average pre-game threshold value, updating the average pre-game threshold value with the average value.

6. The computer-implemented method of claim 1, wherein the determining that the in-game performance metric meets the in-game performance threshold comprises:
    calculating a plurality of in-game performance metrics for each member of a first team and for each member of a second team at a plurality of time intervals; and
    comparing, as a player threshold, each of the in-game performance metrics for a first member of the first team with the each of the in-game performance metrics for a respective member of the second team.

7. The computer-implemented method of claim 1, wherein the player data comprises aggregated pre-game performance metrics of each player among a plurality of players of the video game prior to actual game play of the video game.

8. The computer-implemented method of claim 7, wherein determining the aggregated statistics comprises:
    determining aggregated in-game performance metrics of each player among the plurality of players from the video game play session content.

9. The computer-implemented method of claim 1, further comprising:
    determining whether the video game play session is to be recommended based on the comparing.

10. A system for automatically generating for display a recommendation for video game play session content of a video game, comprising:
    a memory configured to:
        store player data and settings for the video game; and
    a control circuitry coupled to the memory and configured to:
        access the memory to retrieve stored pre-game performance metrics for the video game;
        determine that a pre-game player performance metric of the stored pre-game performance metrics meets a pre-game threshold based on stored player data for the video game;
        receiving game play input, via a user interface, corresponding to the video game play session, the input received via at least one of: a video game controller, a keyboard, or a mouse;
        in response to determining that the pre-game performance metric meets the pregame threshold, calculate an in-game performance metric based on the received game play input and on stored metadata associated with the video game play session content that is indicative of aspects of game play;

determine that the in-game performance metric meets an in-game performance threshold;

in response to determining that the in-game performance metric meets the in-game performance threshold, determine aggregated statistics from the video game play session content;

analyze the aggregated statistics relative to the stored player data and stored settings for the video game, wherein the analyzing comprises comparing the in-game performance metrics with the pre-game performance metrics and calculating an average score associated with the in-game performance metrics to determine the quality of the video game play session; and based on the analysis, automatically generate for display a recommendation to view a segment of the video game play session.

11. The system of claim 10, wherein the control circuitry is further configured to:

determine a genre of the video game.

12. The system of claim 11, wherein the control circuitry is further configured to:

calculate the pre-game performance metric and post-game performance metric based on the genre.

13. The system of claim 10, wherein to determine that the pre-game performance metric meets a pre-game threshold, the control circuitry is further configured to:

calculate a plurality of pre-game performance metrics of each of a first team and a second team;

compute an average value of the pre-game performance metrics of each of the first and the second teams; and compare the average value with an average pre-game threshold value of the pre-game threshold.

14. The system of claim 13, wherein the control circuitry is further configured to:

determine that the average value is greater than the average pre-game threshold value; and in response to determining that the average value is greater than the average pre-game threshold value, update the average pre-game threshold value with the average value.

15. The system of claim 10, wherein to determine that the in-game performance metric meets an in-game performance threshold, the control circuitry is configured to:

calculate a plurality of in-game performance metrics for each member of a first team and for member of a second team at a plurality of time intervals; and compare, as a player threshold, each of the in-game performance metrics for each member of the first team with the each of the in-game performance metrics for a respective member of the second team.

16. The system of claim 10, wherein the player data comprises aggregated pre-game performance metrics of each player among a plurality of players of the video game prior to actual game play of the video game.

17. The system of claim 16, wherein to determine the aggregated statistics, the control circuitry is configured to:

determine aggregated in-game performance metrics of each player among the plurality of players from the video game play session content.

18. The system of claim 10, wherein the control circuitry is configured to:

determine whether the video game play session is to be recommended based on the comparing.

* * * * *